US012703257B2

(12) United States Patent
Gu et al.

(10) Patent No.: US 12,703,257 B2
(45) Date of Patent: Aug. 11, 2026

(54) CHARGING CIRCUIT OF ON-BOARD CHARGER, ON-BOARD CHARGER, AND CHARGING CONTROL METHOD

(71) Applicant: Huawei Digital Power Technologies Co., Ltd., Shenzhen (CN)

(72) Inventors: Shida Gu, Shenzhen (CN); Wei Zhang, Dongguan (CN); Yang Cheng, Xi'an (CN); Zhaoxue Cui, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 926 days.

(21) Appl. No.: 17/987,290

(22) Filed: Nov. 15, 2022

(65) Prior Publication Data

US 2023/0070930 A1 Mar. 9, 2023

Related U.S. Application Data

(63) Continuation of application No. PCT/CN2020/141899, filed on Dec. 31, 2020.

(30) Foreign Application Priority Data

May 15, 2020 (CN) ......................... 202010413876.4

(51) Int. Cl.
*H02J 7/00* (2026.01)
*B60L 53/22* (2019.01)
(Continued)

(52) U.S. Cl.
CPC ................ *B60L 53/22* (2019.02); *H02J 7/06* (2013.01); *H02M 1/4233* (2013.01);
(Continued)

(58) Field of Classification Search
USPC ......................... 320/107, 108, 109, 110, 112
See application file for complete search history.

(56) References Cited

U.S. PATENT DOCUMENTS

2011/0181236 A1* 7/2011 Yang ....................... B60L 58/20 320/107
2012/0068663 A1 3/2012 Tanikawa et al.
(Continued)

FOREIGN PATENT DOCUMENTS

CN 102694409 A 9/2012
CN 203933407 U 11/2014
(Continued)

*Primary Examiner* — Brian Ngo
(74) *Attorney, Agent, or Firm* — Conley Rose, P.C.

(57) ABSTRACT

A charging circuit of an on-board charger, where a second end of a first power conversion circuit of the charging circuit is coupled to a first end of a second power conversion circuit, a high-voltage output end of the second power conversion circuit charges a power battery pack of an electric vehicle, and a first low-voltage output end of the second power conversion circuit supplies power to a low-voltage system of the electric vehicle. The first power conversion circuit is configured to, when the electric vehicle is in a charging mode, convert an alternating current input from a first end of the first power conversion circuit into a direct current and transmit the direct current to the first end of the second power conversion circuit.

20 Claims, 19 Drawing Sheets

(51) Int. Cl.

| | |
|---|---|
| ***H02J 7/06*** | (2006.01) |
| ***H02M 1/42*** | (2007.01) |
| ***H02M 3/335*** | (2006.01) |
| ***H02M 7/219*** | (2006.01) |

(52) U.S. Cl.

CPC ....... *H02M 3/33576* (2013.01); *H02M 7/219* (2013.01); *B60L 2210/30* (2013.01); *B60L 2210/40* (2013.01); *H02J 2207/20* (2020.01)

(56) References Cited

U.S. PATENT DOCUMENTS

| | | | | |
|---|---|---|---|---|
| 2012/0235626 | A1 | 9/2012 | Oh et al. | |
| 2019/0143822 | A1 | 5/2019 | Malek et al. | |
| 2019/0176652 | A1 | 6/2019 | Teng et al. | |
| 2019/0245432 | A1 * | 8/2019 | Yan .................. | H02M 3/33576 |
| 2020/0195018 | A1 | 6/2020 | Liu et al. | |
| 2023/0070930 | A1 | 3/2023 | Gu et al. | |

FOREIGN PATENT DOCUMENTS

| | | | |
|---|---|---|---|
| CN | 107444123 | A | 12/2017 |
| CN | 107623365 | A | 1/2018 |
| CN | 208209804 | U | 12/2018 |
| CN | 109167423 | A | 1/2019 |
| CN | 109177757 | A | 1/2019 |
| CN | 109756122 | A | 5/2019 |
| CN | 208947111 | U | 6/2019 |
| CN | 110040028 | A | 7/2019 |
| CN | 111641247 | A | 9/2020 |
| EP | 1919070 | A2 | 5/2008 |
| KR | 102064876 | B1 | 2/2020 |

* cited by examiner

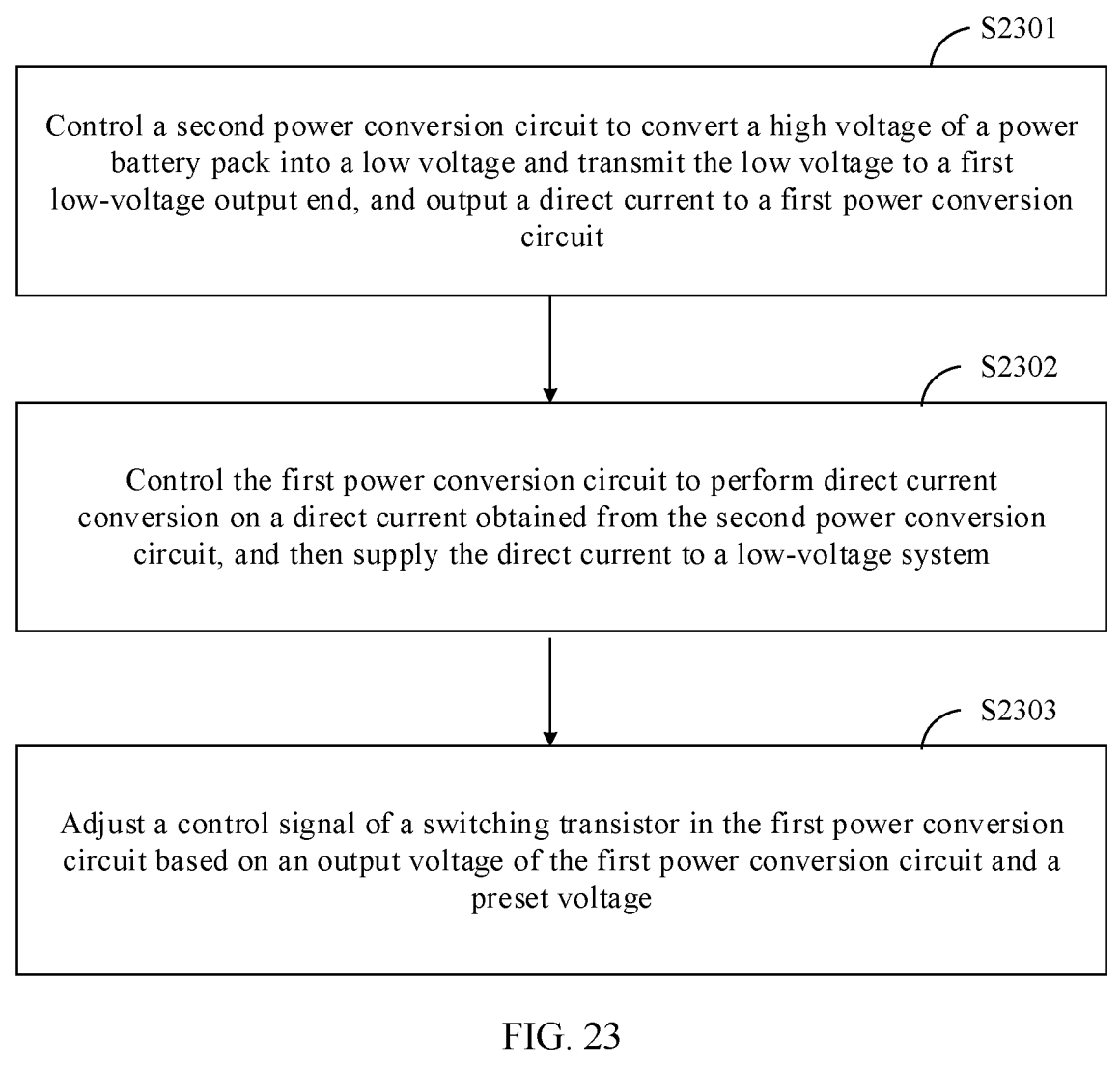

S2301

Control a second power conversion circuit to convert a high voltage of a power battery pack into a low voltage and transmit the low voltage to a first low-voltage output end, and output a direct current to a first power conversion circuit

S2302

Control the first power conversion circuit to perform direct current conversion on a direct current obtained from the second power conversion circuit, and then supply the direct current to a low-voltage system

S2303

Adjust a control signal of a switching transistor in the first power conversion circuit based on an output voltage of the first power conversion circuit and a preset voltage

FIG. 23

CHARGING CIRCUIT OF ON-BOARD CHARGER, ON-BOARD CHARGER, AND CHARGING CONTROL METHOD

CROSS-REFERENCE TO RELATED APPLICATIONS

This is a continuation of International Patent Application No. PCT/CN2020/141899 filed on Dec. 31, 2020, which claims priority to Chinese Patent Application No. 202010413876.4 filed on May 15, 2020. The disclosures of the aforementioned applications are hereby incorporated by reference in their entireties.

TECHNICAL FIELD

This disclosure relates to the field of on-board charger technologies, and in particular, to a charging circuit of an on-board charger, an on-board charger, and a charging control method.

BACKGROUND

As an energy shortage issue and an environmental pollution issue in the modern society aggravate, an electric vehicle as a new energy vehicle attracts extensive attention from all circles. Currently, an electric vehicle can be equipped with an on-board charger. The on-board charger can simultaneously supply electrical energy to a power battery pack and a low-voltage system of the electric vehicle.

FIG. 1 is a schematic diagram of an on-board charger.

A power factor correction (PFC) circuit 01 can convert an alternating current (AC) input into a direct current (DC) output, and output a direct current to an on-board charger (OBC) circuit 02. The on-board charger circuit 02 is configured to charge a power battery pack of an electric vehicle. That is, a high-voltage side $V_{HV}$ is connected to the power battery pack in the figure. When the electric vehicle is in a driving mode, the alternating current input is disconnected. In this case, a DC-DC conversion circuit 03 is configured to convert a high voltage of the power battery pack into a low voltage, to supply electric energy to a low-voltage system of the electric vehicle.

However, when the DC-DC conversion circuit 03 is faulty, the low-voltage system of the electric vehicle may not operate normally, and safe operation of the electric vehicle is threatened. In a solution, the electric vehicle is provided with a low-voltage battery as an alternative power supply when the DC-DC conversion circuit 03 is faulty. However, a capacity and a discharging capability of the low-voltage battery are limited, and the low-voltage system still cannot operate normally when the capacity is excessively low. In another solution, two DC-DC conversion circuits are connected at a high-voltage side to implement dual redundant outputs. However, costs of implementing this solution are high.

SUMMARY

This disclosure provides a charging circuit of an on-board charger, an on-board charger, and a charging control method, to provide dual redundant low-voltage direct current outputs.

According to a first aspect, this disclosure provides a charging circuit of an on-board charger. The charging circuit includes a first power conversion circuit and a second power conversion circuit. A second end of the first power conversion circuit is connected to a first end of the second power conversion circuit, a high-voltage output end of the second power conversion circuit charges a power battery pack of an electric vehicle, and a first low-voltage output end of the second power conversion circuit supplies power to a low-voltage system of the electric vehicle.

The first power conversion circuit is configured to, when the electric vehicle is in a charging mode, convert an alternating current input from a first end of the first power conversion circuit into a direct current and transmit the direct current to the first end of the second power conversion circuit. In this case, the first power conversion circuit functions as a power factor correction circuit. That is, the first power conversion circuit has a function of the power factor correction circuit and implements alternating current-direct current conversion. The first power conversion circuit is further configured to, when the electric vehicle is in a driving mode, perform direct current conversion on the direct current obtained from the second power conversion circuit and supply a converted current to the low-voltage system. In this case, the first power conversion circuit functions as a DC-DC conversion circuit. The second power conversion circuit is configured to, when the electric vehicle is in the driving mode, convert a high voltage of the power battery pack into a low voltage, transmit the low voltage to the first low-voltage output end, and output a direct current to the first power conversion circuit.

The first power conversion circuit of the charging circuit has different functions when the electric vehicle is in different modes. Further, the first power conversion circuit functions as the power factor correction circuit when the electric vehicle is in the charging mode, and functions as the DC-DC conversion circuit when the electric vehicle is in the driving mode. Therefore, dual redundant low-voltage direct current outputs can be provided, so that an additional DC-DC circuit is not needed. This reduces complexity of the solution and a space occupied by a circuit, and can further reduce costs and materials.

With reference to the first aspect, in a first possible implementation, the first power conversion circuit and the second power conversion circuit each include a controllable switching transistor. The charging circuit further includes a controller. The controller is configured to control operating states of the controllable switching transistors in the first power conversion circuit and the second power conversion circuit, so that the first power conversion circuit and the second power conversion circuit implement the foregoing functions when the electric vehicle is in the charging mode and the driving mode. In some embodiments, the controller may adjust a pulse width modulation (PWM) signal sent to each controllable switching transistor, to control an operating state of the switching transistor.

With reference to the first aspect, in a second possible implementation, the second power conversion circuit includes a primary-side switching circuit, a first transformer, a high-voltage secondary-side switching circuit, and a low-voltage secondary-side switching circuit. A first end of the primary-side switching circuit is the first end of the second power conversion circuit, and a second end of the primary-side switching circuit is connected to a primary-side winding of the first transformer. A high-voltage secondary-side winding of the first transformer is connected to a first end of the high-voltage secondary-side switching circuit, and a second end of the high-voltage secondary-side switching circuit is the high-voltage output end of the second power conversion circuit. A low-voltage secondary-side winding of the first transformer is connected to a first end of the low-voltage secondary-side switching circuit, and a second end of the low-voltage secondary-side switching circuit is the first low-voltage output end of the second power conversion circuit.

The controller is configured to, when the electric vehicle is in the driving mode, control a switching transistor in the high-voltage secondary-side switching circuit, to convert a direct current input by the power battery pack into an alternating current and then transmit the alternating current to the high-voltage secondary-side winding. The controller is further configured to, when the electric vehicle is in the driving mode, control a switching transistor in the primary-side switching circuit, to convert an alternating current input by the primary-side winding into a direct current and transmit the direct current to the first power conversion circuit. The controller is further configured to, when the electric vehicle is in the driving mode, control a switching transistor in the low-voltage secondary-side switching circuit, to convert an alternating current transmitted by the low-voltage secondary-side winding into a direct current and transmit the direct current to the first low-voltage output end.

In this case, the second power conversion circuit is configured to convert the high voltage of the power battery pack into a low voltage needed by the low-voltage system and output the low voltage, to form a first low-voltage direct current output.

With reference to the first aspect, in a third possible implementation, the first power conversion circuit includes a full-bridge switching circuit, a second transformer, a first switching transistor, a second switching transistor, a first capacitor, and a first inductor. The full-bridge switching circuit includes two bridge arms. An upper half bridge arm and a lower half bridge arm of each of the two bridge arms each include a switching transistor. An output end of the full-bridge switching circuit is the second end of the first power conversion circuit. A middle point of a first bridge arm is connected in series to a primary-side winding of the second transformer and then is connected to one port of the first end of the first power conversion circuit. A middle point of a second bridge arm is connected to the other port of the first end of the first power conversion circuit. A first end of a secondary-side winding of the second transformer is connected in series to the first switching transistor and then is connected to a first end point. A second end of the secondary-side winding of the second transformer is connected in series to the second switching transistor and then is connected to the first end point. A central tap of the secondary-side winding of the second transformer is sequentially connected in series to the first capacitor and the first inductor and then is connected to the first end point. The first end point is connected to one port of a second low-voltage output end, and the other port of the second low-voltage output end is connected between the first inductor and the first capacitor. In this case, the first power conversion circuit can implement a function of the power factor correction circuit and a function of the DC-DC conversion circuit. Therefore, function multiplexing is implemented, and an additional complete DC-DC circuit is not needed.

In this case, when the electric vehicle is in the driving mode, the controller controls a switching transistor in the full-bridge switching circuit, the first switching transistor, and the second switching transistor, so that the first power conversion circuit performs direct current conversion on a direct current obtained from the primary-side switching circuit and transmits a converted current to the second low-voltage output end, to form a second low-voltage direct current output.

With reference to the first aspect, in a fourth possible implementation, the first power conversion circuit further includes a third switching transistor. In this case, that the other port of the second low-voltage output end is connected between the first inductor and the first capacitor further includes that a first end of the third switching transistor is connected between the first inductor and the first capacitor, and a second end of the third switching transistor is connected to the other port of the second low-voltage output end.

When the electric vehicle is in the charging mode, the controller controls the third switching transistor to be turned off, to prevent an induced voltage generated on the second transformer from being transmitted to the second low-voltage output end. When the electric vehicle is in the driving mode, the controller controls the third switching transistor to be turned on, so that the first power conversion circuit is connected to the second low-voltage output end. Therefore, the first power conversion circuit can supply power to the low-voltage system through the second low-voltage output end.

With reference to the first aspect, in a fifth possible implementation, the charging circuit further includes a first switch and a second switch. A first end of the first switch is connected to a first alternating current port, and a second end of the first switch is connected to a first end of the second switch. The middle point of the first bridge arm is connected in series to the primary-side winding of the second transformer and then is connected to a second end of the second switch. The second end of the second switch is connected to a second alternating current port, and the first end of the second switch is further connected to the middle point of the second bridge arm.

When the electric vehicle is in the charging mode, the controller controls the first switch to be turned on and the second switch to be turned off, so that the first power conversion circuit is connected to an alternating current port. When the electric vehicle is in the driving mode, the controller controls the first switch to be turned off and the second switch to be turned on, so that the first power conversion circuit and the alternating current port are disconnected, and the middle point of the first bridge arm of the full-bridge switching circuit is sequentially connected to the primary-side winding of the second transformer and the middle point of the second bridge arm, to form a closed circuit. In this way, the first power conversion circuit can implement a DC-DC conversion function.

With reference to the first aspect, in a sixth possible implementation, the first power conversion circuit further includes a full-bridge switching circuit, a first inductor, a first switch, a second switch, and a first capacitor. The full-bridge switching circuit includes two bridge arms. An upper half bridge arm and a lower half bridge arm of each of the two bridge arms each include a switching transistor. A middle point of a first bridge arm is connected to a first end of the first switch, the middle point of the first bridge arm is further connected to one port of the first end of the first power conversion circuit, and a second end of the first switch is connected to one port of a second low-voltage output end. A middle point of a second bridge arm is connected in series to the first inductor and then is connected to a first end of the second switch and the other port of the first end of the first power conversion circuit. A second end of the second switch is connected to the other port of the second low-voltage output end. The first capacitor is connected in parallel between the second end of the first switch and the second end of the second switch. An output end of the full-bridge switching circuit is the second end of the first power conversion circuit. In this case, the first power conversion circuit can implement a function of the power factor correction circuit and a function of the DC-DC conversion circuit that is further a Buck circuit. Therefore, function multiplexing is implemented, and an additional complete DC-DC circuit is not needed.

When the electric vehicle is in the driving mode, the controller controls the first switch and the second switch to be turned on, and controls an operating state of a switching transistor in the full-bridge switching circuit, so that the first power conversion circuit performs direct current conversion on a direct current obtained from the primary-side switching circuit and transmits a converted current to the second low-voltage output end, to form a second low-voltage direct current output.

With reference to the first aspect, in a seventh possible implementation, the charging circuit further includes a third switch and a fourth switch. A first end of the third switch is connected to a first alternating current port, and a second end of the third switch is connected to a port of the first end of the first power conversion circuit. A first end of the fourth switch is connected to a second alternating current port, and a second end of the fourth switch is connected to the other port of the first end of the first power conversion circuit.

When the electric vehicle is in the charging mode, the controller controls the third switch and the fourth switch to be turned on, so that the first power conversion circuit is connected to an alternating current port. When the electric vehicle is in the driving mode, the controller controls the third switch and the fourth switch to be turned off, so that the first power conversion circuit and the alternating current port are disconnected.

With reference to the first aspect, in an eighth possible implementation, a positive output end of the second low-voltage output end is connected to a positive output end of the first low-voltage output end, and a negative output end of the second low-voltage output end is connected to a negative output end of the first low-voltage output end. In this case, the charging circuit presents a low-voltage output end for an externally connected low-voltage system of the electric vehicle.

With reference to the first aspect, in a ninth possible implementation, when the electric vehicle is in the charging mode, the controller controls the switching transistor in the full-bridge switching circuit to convert an alternating current input from an input end of the full-bridge switching circuit into a direct current and supply the direct current to the primary-side switching circuit. The controller is further configured to, when the electric vehicle is in the charging mode, control a switching transistor in the primary-side switching circuit, so that the primary-side switching circuit converts the direct current into an alternating current, transmits the alternating current to a high-voltage output end through the first transformer to charge the power battery pack, and transmits the alternating current to a first low-voltage output end to supply power to the low-voltage system.

With reference to the first aspect, in a tenth possible implementation, when the electric vehicle is in the driving mode, the controller controls the switching transistor of the upper half bridge arm of the first bridge arm and the switching transistor of the lower half bridge arm of the second bridge arm to be simultaneously turned on or turned off, controls the switching transistor of the lower half bridge arm of the first bridge arm and the switching transistor of the upper half bridge arm of the second bridge arm to be simultaneously turned on or turned off, and controls the switching transistor of the upper half bridge arm of the first bridge arm and the switching transistor of the lower half bridge arm of the first bridge arm not to be simultaneously turned on, to convert the direct current obtained from the primary-side switching circuit into an alternating current and then transmit the alternating current to the primary-side winding of the second transformer. In this way, the secondary-side winding of the second transformer generates a corresponding induced voltage. In some embodiments, an output voltage of the full-bridge switching circuit can also be controlled by adjusting a duty cycle of a control signal of each switching transistor.

With reference to the first aspect, in an eleventh possible implementation, when the electric vehicle is in the driving mode, the controller controls the switching transistor of the upper half bridge arm of the first bridge arm to maintain a turn-on state, controls the switching transistor of the lower half bridge arm of the first bridge arm to maintain a turn-off state, and controls the switching transistor of the upper half bridge arm of the second bridge arm and the switching transistor of the lower half bridge arm of the second bridge arm to be alternately turned on. In this way, the first power conversion circuit is equivalent to a Buck circuit, reduces a voltage of the direct current obtained from the primary-side switching circuit, and then transmits a voltage-reduced current to the second low-voltage output end. The controller may adjust an output voltage by adjusting a duty cycle of a control signal of the switching transistor of the upper half bridge arm of the second bridge arm and a duty cycle of a control signal of the switching transistor of the lower half bridge arm of the second bridge arm.

With reference to the first aspect, in a twelfth possible implementation, the controller is further configured to adjust a control signal of a switching transistor in the full-bridge switching circuit based on an output voltage of the second low-voltage output end and a preset voltage.

In actual application, a load of the low-voltage system may change. Therefore, to enable the low-voltage system to operate normally, a voltage output by the second low-voltage output end needs to be adjusted in real time to match the preset voltage, where the preset voltage represents a voltage required by the current low-voltage system.

With reference to the first aspect, in a thirteenth possible implementation, when the output voltage of the second low-voltage output end is less than the preset voltage, the controller increases a duty cycle of the control signal of the switching transistor in the full-bridge switching circuit, so that the output voltage of the second low-voltage output end is increased to the preset voltage, and when the output voltage of the second low-voltage output end is greater than the preset voltage, the controller reduces the duty cycle of the control signal of the switching transistor in the full-bridge switching circuit, so that the output voltage of the second low-voltage output end is reduced to the preset voltage. Further, the output voltage of the second low-voltage output end can be adjusted according to a real-time requirement, thereby improving availability of the charging circuit.

With reference to the first aspect, in a fourteenth possible implementation, the controller is further configured to adjust a duty cycle of a control signal of a controllable switching transistor in the primary-side switching circuit and/or the high-voltage secondary-side switching circuit, so that a direct current voltage output by the primary-side switching circuit to the first power conversion circuit remains stable. This is because when the electric vehicle is in the driving mode, the output voltage of the power battery pack decreases as power of the power battery pack is continuously consumed. Therefore, to enable the direct current voltage output by the primary-side switching circuit to the first power conversion circuit remains stable, the duty cycle of the control signal of the controllable switching transistor in the primary-side switching circuit and/or the high-voltage secondary-side switching circuit may be adjusted, for example, the duty cycle may be increased. Further, because the direct current voltage output by the first power conversion circuit remains stable, control over a switching transistor in the second power conversion circuit is decoupled from control over a switching transistor in the full-bridge switching circuit, so that the switching transistor in the second power conversion circuit and the switching transistor in the full-bridge switching circuit can be separately controlled without affecting each other. Further, when a load of the low-voltage system changes and the output voltage of the second low-voltage output end needs to be adjusted, only the control signal of the switching transistor in the full-bridge switching circuit needs to be adjusted, and a control signal of the switching transistor in the second power conversion circuit does not need to be adjusted at the same time. Therefore, control logic is simplified.

With reference to the first aspect, in a fifteenth possible implementation, the charging circuit further includes a secondary-side high-voltage capacitor and a secondary-side low-voltage capacitor. The secondary-side high-voltage capacitor is connected in parallel to a positive output end and a negative output end of the high-voltage output end. The secondary-side low-voltage capacitor is connected in parallel to a positive output end and a negative output end of the low-voltage output end.

The secondary-side high-voltage capacitor is configured to reduce voltage fluctuation at the high-voltage output end, and the secondary-side low-voltage capacitor is configured to reduce voltage fluctuation at the low-voltage output end.

With reference to the first aspect, in a sixteenth possible implementation, the charging circuit further includes a bus capacitor. The bus capacitor is connected in parallel between two ports at the second end of the first power conversion circuit. The bus capacitor is configured to reduce fluctuation of a direct current voltage.

With reference to the first aspect, in a seventeenth possible implementation, the controllable switching transistors in the first power conversion circuit and the second power conversion circuit are controlled by a same controller or a plurality of controllers. In some embodiments, the switching transistors of the first power conversion circuit are controlled by one controller, and the switching transistors of the second power conversion circuit are controlled by another controller. In some other embodiments, switching transistors connected to a high-voltage output end are controlled by one controller, to be specific, the switching transistors in the full-bridge switching circuit, the primary-side switching circuit, and the high-voltage secondary-side switching circuit are controlled by one controller, and switching transistors connected to a low-voltage output end are controlled by another controller.

According to a second aspect, this disclosure further provides an on-board charger. The on-board charger includes the charging circuit of an on-board charger provided in any one of the foregoing possible implementations, and further includes an electromagnetic interference (EMI) filter circuit. An input end of the electromagnetic interference filter circuit is connected to an alternating current input of the on-board charger, and an output end is connected to the first end of the first power conversion circuit. The electromagnetic interference filter circuit is configured to filter out electromagnetic interference.

According to a third aspect, this disclosure further provides a charging control method. The method is applied to a charging circuit of an on-board charger and includes controlling, when an electric vehicle is in a charging mode, a first power conversion circuit to convert an alternating current input from a first end into a direct current and transmit the direct current to a first end of a second power conversion circuit, and when the electric vehicle is in a driving mode, controlling the second power conversion circuit to convert a high voltage of a power battery pack into a low voltage, transmit the low voltage to a first low-voltage output end, and output a direct current to the first power conversion circuit, and further controlling the first power conversion circuit to perform direct current conversion on a direct current obtained from the second power conversion circuit and supply a converted circuit to the low-voltage system.

By using the control method, the first power conversion circuit may have different functions when the electric vehicle is in different modes. Further, the first power conversion circuit functions as a power factor correction circuit when the electric vehicle is in the charging mode, and functions as a DC-DC conversion circuit when the electric vehicle is in the driving mode. Therefore, dual redundant low-voltage direct current outputs are provided, so that an additional DC-DC circuit is not needed, and costs are reduced.

With reference to the third aspect, in a first possible implementation, the second power conversion circuit includes a primary-side switching circuit, a first transformer, a high-voltage secondary-side switching circuit, and a low-voltage secondary-side switching circuit. A first end of the primary-side switching circuit is the first end of the second power conversion circuit, and a second end of the primary-side switching circuit is connected to a primary-side winding of the first transformer. A high-voltage secondary-side winding of the first transformer is connected to a first end of the high-voltage secondary-side switching circuit, and a second end of the high-voltage secondary-side switching circuit is a high-voltage output end of the second power conversion circuit. A low-voltage secondary-side winding of the first transformer is connected to a first end of the low-voltage secondary-side switching circuit, and a second end of the low-voltage secondary-side switching circuit is the first low-voltage output end of the second power conversion circuit. The controlling, when the electric vehicle is in a driving mode, the second power conversion circuit to convert a high voltage of a power battery pack into a low voltage, transmit the low voltage to a first low-voltage output end, and output a direct current to the first power conversion circuit further includes controlling a switching transistor in the high-voltage secondary-side switching circuit to convert a direct current input by the power battery pack into an alternating current and then transmit the alternating current to the high-voltage secondary-side winding, controlling a switching transistor in the primary-side switching circuit to convert an alternating current input by the primary-side winding into a direct current and transmit the direct current to the first power conversion circuit, and controlling a switching transistor in the low-voltage secondary-side switching circuit to convert an alternating current transmitted by the low-voltage secondary-side winding into a direct current and transmit the direct current to the first low-voltage output end.

With reference to the third aspect, in a second possible implementation, the first power conversion circuit further includes a full-bridge switching circuit, a second transformer, a first switching transistor, a second switching transistor, a first capacitor, and a first inductor. The full-bridge switching circuit includes two bridge arms. An upper half bridge arm and a lower half bridge arm of each of the two bridge arms each include a switching transistor. An output end of the full-bridge switching circuit is a second end of the first power conversion circuit, and another output end of the full-bridge switching circuit is a first end of the first power conversion circuit. A middle point of a first bridge arm is connected in series to a primary-side winding of the second transformer and then is connected to one port of the first end of the first power conversion circuit. A middle point of a second bridge arm is connected to the other port of the first end of the first power conversion circuit. A first end of a secondary-side winding of the second transformer is connected in series to the first switching transistor and then is connected to a first end point. A second end of the secondary-side winding of the second transformer is connected in series to the second switching transistor and then is connected to the first end point. A central tap of the secondary-side winding of the second transformer is sequentially connected in series to the first capacitor and the first inductor and then is connected to the first end point. The first end point is connected to a negative output end of a second low-voltage output end, and a positive output end of the second low-voltage output end is connected between the first inductor and the first capacitor. The method further includes, when the electric vehicle is in the driving mode, controlling a switching transistor in the full-bridge switching circuit, the first switching transistor, and the second switching transistor, so that the first power conversion circuit performs direct current conversion on a direct current obtained from the primary-side switching circuit and then transmits a converted current to the second low-voltage output end.

With reference to the third aspect, in a third possible implementation, the first power conversion circuit further includes a third switching transistor. That the positive output end of the second low-voltage output end is connected between the first inductor and the first capacitor further includes that a first end of the third switching transistor is connected between the first inductor and the first capacitor, and a second end of the third switching transistor is connected to the positive output end of the second low-voltage output end. The method further includes controlling, when the electric vehicle is in the charging mode, the third switching transistor to be turned off, and controlling, when the electric vehicle is in the driving mode, the third switching transistor to be turned on.

With reference to the third aspect, in a fourth possible implementation, the charging circuit further includes a first switch and a second switch. A first end of the first switch is connected to a first alternating current port, and a second end of the first switch is connected to a first end of the second switch. The middle point of the first bridge arm is connected in series to the primary-side winding of the second transformer and then is connected to a second end of the second switch. The second end of the second switch is connected to a second alternating current port, and the first end of the second switch is further connected to the middle point of the second bridge arm. The method further includes controlling, when the electric vehicle is in the charging mode, the first switch to be turned on and the second switch to be turned off, and controlling, when the electric vehicle is in the driving mode, the first switch to be turned off and the second switch to be turned on.

With reference to the third aspect, in a fifth possible implementation, the first power conversion circuit further includes a full-bridge switching circuit, a first inductor, a first switch, a second switch, and a first capacitor. The full-bridge switching circuit includes two bridge arms. An upper half bridge arm and a lower half bridge arm of each of the two bridge arms each include a switching transistor. A middle point of a first bridge arm is connected to a first end of the first switch, the middle point of the first bridge arm is further connected to one port of the first end of the first power conversion circuit, and a second end of the first switch is connected to a positive output end of the second low-voltage output end. A middle point of a second bridge arm is connected in series to the first inductor and then is connected to a first end of the second switch and the other port of the first end of the first power conversion circuit. A second end of the second switch is connected to a negative output end of the second low-voltage output end. The first capacitor is connected in parallel between the second end of the first switch and the second end of the second switch. An output end of the full-bridge switching circuit is the second end of the first power conversion circuit. The method further includes, when the electric vehicle is in the driving mode, controlling the first switch and the second switch to be turned on, and controlling an operating state of a switching transistor in the full-bridge switching circuit, so that the first power conversion circuit performs direct current conversion on a direct current obtained from the primary-side switching circuit and then transmits a converted current to the second low-voltage output end.

With reference to the third aspect, in a sixth possible implementation, the charging circuit further include a third switch and a fourth switch. A first end of the third switch is connected to a first alternating current port, and a second end of the third switch is connected to a port of the first end of the first power conversion circuit. A first end of the fourth switch is connected to a second alternating current port, and a second end of the fourth switch is connected to the other port of the first end of the first power conversion circuit. The method further includes controlling, when the electric vehicle is in the charging mode, the third switch and the fourth switch to be turned on, and controlling, when the electric vehicle is in the driving mode, the third switch and the fourth switch to be turned off.

With reference to the third aspect, in a seventh possible implementation, the positive output end of the second low-voltage output end is connected to a positive output end of the first low-voltage output end, and the negative output end of the second low-voltage output end is connected to a negative output end of the first low-voltage output end.

With reference to the third aspect, in an eighth possible implementation, when the electric vehicle is in the charging mode, the method further includes controlling a switching transistor in the full-bridge switching circuit to convert an alternating current input from an input end of the full-bridge switching circuit into a direct current and then supply the direct current to the primary-side switching circuit, and controlling a switching transistor in the primary-side switching circuit, so that the primary-side switching circuit converts the direct current into an alternating current, transmits the alternating current to the high-voltage output end through the first transformer to charge the power battery pack, and transmits the alternating current into the first low-voltage output end to supply power to the low-voltage system.

With reference to the third aspect, in a ninth possible implementation, controlling an operating state of a switching transistor in the full-bridge switching circuit further includes controlling the switching transistor of the upper half bridge arm of the first bridge arm and the switching transistor of the lower half bridge arm of the second bridge arm to be simultaneously turned on or turned off, controlling the switching transistor of the lower half bridge arm of the first bridge arm and the switching transistor of the upper half bridge arm of the second bridge arm to be simultaneously turned on or turned off, and controlling the switching transistor of the upper half bridge arm of the first bridge arm and the switching transistor of the lower half bridge arm of the first bridge arm not to be simultaneously turned on.

With reference to the third aspect, in a tenth possible implementation, controlling an operating state of a switching transistor in the full-bridge switching circuit further includes controlling the switching transistor of the upper half bridge arm of the first bridge arm to maintain a turn-on state, controlling the switching transistor of the lower half bridge arm of the first bridge arm to maintain a turn-off state, and controlling the switching transistor of the upper half bridge arm of the second bridge arm and the switching transistor of the lower half bridge arm of the second bridge arm to be alternately turned on.

In this case, the first power conversion circuit is equivalent to a Buck circuit, and performs voltage reduction on a direct current obtained from the primary-side switching circuit, and then transmits a voltage-reduced current to the second low-voltage output end. An output voltage is adjusted by adjusting a duty cycle of a control signal of the switching transistor of the upper half bridge arm of the second bridge arm and a duty cycle of a control signal of the switching transistor of the lower half bridge arm of the second bridge arm.

With reference to the third aspect, in an eleventh possible implementation, the method further includes adjusting a control signal of a switching transistor in the full-bridge switching circuit based on an output voltage of the second low-voltage output end and a preset voltage.

A load of the low-voltage system may change. Therefore, to enable the low-voltage system to operate normally, a voltage output by the second low-voltage output end needs to be adjusted in real time to match the preset voltage, where the preset voltage represents a voltage required by the current low-voltage system.

With reference to the third aspect, in a twelfth possible implementation, adjusting a control signal of a switching transistor in the full-bridge switching circuit based on an output voltage of the second low-voltage output end and a preset voltage further includes increasing a duty cycle of the control signal of the switching transistor in the full-bridge switching circuit when the output voltage of the second low-voltage output end is less than the preset voltage, so that the output voltage of the second low-voltage output end is increased to the preset voltage, and reducing the duty cycle of the control signal of the switching transistor in the full-bridge switching circuit when the output voltage of the second low-voltage output end is greater than the preset voltage, so that the output voltage of the second low-voltage output end is reduced to the preset voltage. Further, the output voltage of the second low-voltage output end can be adjusted according to a real-time requirement, thereby improving availability of the charging circuit.

With reference to the third aspect, in a thirteenth possible implementation, the method further includes adjusting a duty cycle of a control signal of a controllable switching transistor in the primary-side switching circuit and/or the high-voltage secondary-side switching circuit, so that a direct current voltage output by the primary-side switching circuit to the first power conversion circuit remains stable.

Because the direct current voltage output by the first power conversion circuit remains stable, control over a switching transistor in the second power conversion circuit is decoupled from control over a switching transistor in the full-bridge switching circuit, so that the switching transistor in the second power conversion circuit and the switching transistor in the full-bridge switching circuit can be separately controlled without affecting each other. Further, when a load of the low-voltage system changes and the output voltage of the second low-voltage output end needs to be adjusted, only the control signal of the switching transistor in the full-bridge switching circuit needs to be adjusted, and a control signal of the switching transistor in the second power conversion circuit does not need to be adjusted at the same time. Therefore, control logic is simplified.

The technical solution provided in this disclosure has at least the following advantages.

The charging circuit includes the first power conversion circuit and the second power conversion circuit. When the electric vehicle is in the charging mode, the first power conversion circuit can convert an alternating current input from an input end into a direct current and supply the direct current to the second power conversion circuit. In this case, the first power conversion circuit functions as a power factor correction circuit. That is, the first power conversion circuit has a function of the power factor correction circuit and implements alternating current-direct current conversion. The high-voltage output end of the second power conversion circuit charges the power battery pack of the electric vehicle, and the first low-voltage output end of the second power conversion circuit supplies power to the low-voltage system of the electric vehicle.

When the electric vehicle is in the driving mode, no alternating current is input and the low-voltage system is powered by the power battery pack. In this case, a high-voltage direct current provided by the power battery pack can be converted into a low-voltage direct current through the second power conversion circuit, and then the low-voltage direct current is supplied to the low-voltage system through the first low-voltage output end, to form a first low-voltage direct current output. The second power conversion circuit can also convert a high voltage obtained from the power battery pack into a direct current through current conversion and transmit the direct current to the first power conversion circuit, and the first power conversion circuit performs direct current conversion on the obtained direct current and then supplies the direct current to the low-voltage system, to form a second low-voltage direct current output. In this case, the first power conversion circuit functions as a DC-DC conversion circuit.

In conclusion, the charging circuit can provide dual redundant low-voltage direct current outputs when the electric vehicle is in the driving mode, so that reliability of supplying power to the low-voltage system by the electric vehicle is improved. In addition, the first power conversion circuit has different functions when the electric vehicle is in different modes. Further, the first power conversion circuit functions as a power factor correction circuit when the electric vehicle is in the charging mode, and functions as a DC-DC conversion circuit when the electric vehicle is in the driving mode, so that an additional DC-DC circuit is not needed. Therefore, costs are reduced.

BRIEF DESCRIPTION OF DRAWINGS

FIG. 23 is a schematic diagram of another charging control method according to an embodiment of this disclosure.

DESCRIPTION OF EMBODIMENTS

To make a person skilled in the art better understand the technical solution of this disclosure, the following first describes a current solution in which an on-board charger improves reliability of powering a low-voltage system of an electric vehicle.

In a solution, a low-voltage battery is used as a substitute power supply when a DC-DC conversion circuit fails. However, because a capacity and a discharge capability of the low-voltage battery are limited, when a battery level of the low-voltage battery is excessively low, the low-voltage system still cannot operate normally.

In another solution, two groups of DC-DC conversion circuits may be connected at a high-voltage side, to implement dual redundant low-voltage direct current outputs. This is described below with reference to an accompanying drawing.

Figures 1, 2:
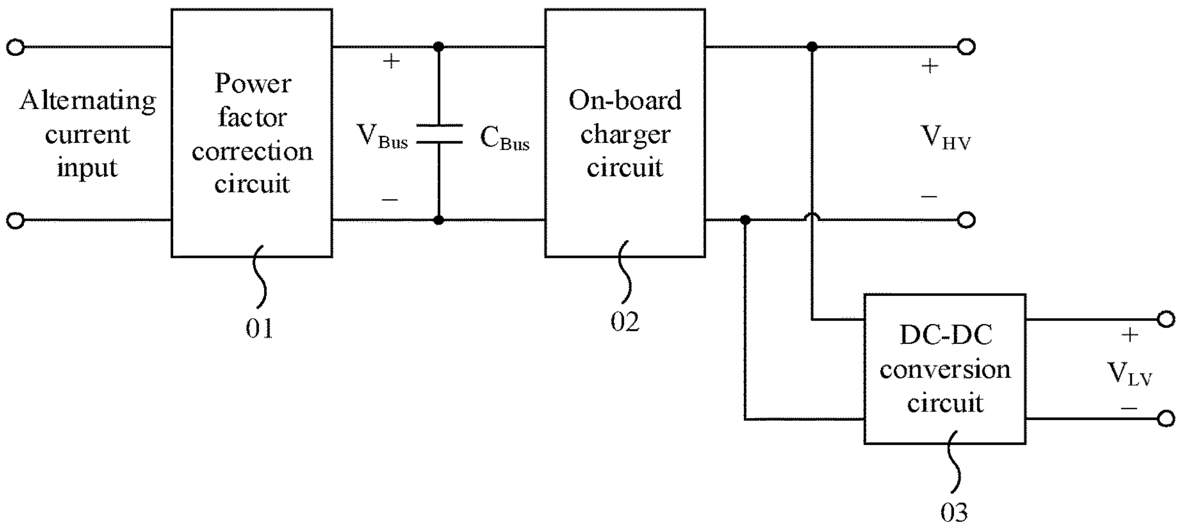
FIG. 1 is a schematic diagram of an on-board charger.
FIG. 2 is a schematic diagram of another on-board charger.

FIG. 2 is a schematic diagram of another on-board charger according to an embodiment of this disclosure.

In this case, a high-voltage side $V_{HV}$ of the on-board charger is connected to two DC-DC conversion circuits, namely, a DC-DC conversion circuit 03*a* and a DC-DC conversion circuit 03*b*, to implement dual redundant low-voltage direct current outputs. However, because a DC-DC converter circuit is additionally added, implementation costs of this solution are high.

To resolve the foregoing technical problem, embodiments of this disclosure provide a charging circuit of an on-board charger, an on-board charger, and a charging control method. When the on-board charger is in a driving mode, energy of a power battery pack is transmitted to a direct current busbar side by a second power conversion circuit. One part of the energy is converted into a low voltage by the second power conversion circuit, and the other part is converted into a low voltage by a first power conversion circuit operating in a DC-DC conversion mode, to provide two redundant low-voltage direct current outputs. The first power conversion circuit functions as a power factor correction circuit when the charging circuit charges the power battery pack, that is, when an electric vehicle is in a charging mode, and functions as a DC-DC conversion circuit when the electric vehicle is in the driving mode, so that an additional DC-DC conversion circuit is not needed. Therefore, costs are reduced. The following provides specific descriptions with reference to the accompanying drawing.

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more features.

In addition, in this disclosure, orientation terms such as "left" and "right" may include but are not limited to being defined relative to orientations of components shown in the accompanying drawings. It should be understood that these orientation terms may be relative concepts, are used for description and clarification of the components, and may be correspondingly changed based on changes of the orientations of components shown in the accompanying drawings.

Charging Circuit Embodiment 1

Figure 3:
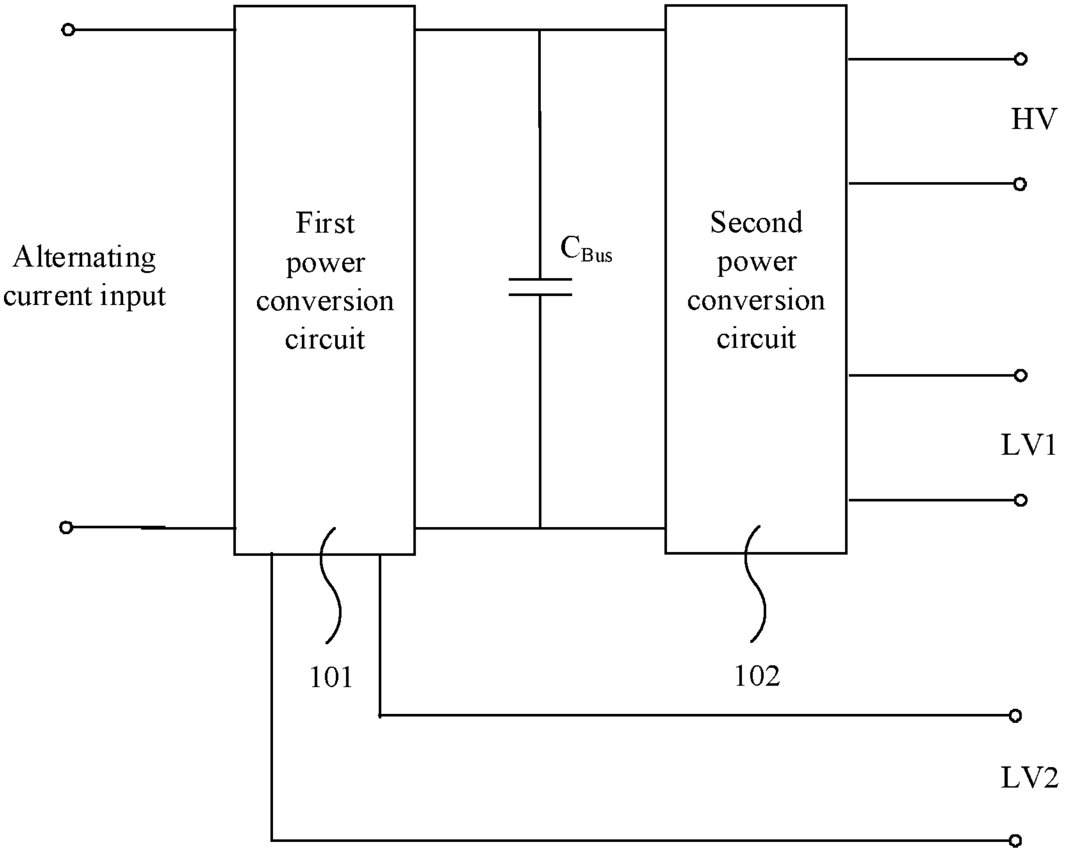
FIG. 3 is a schematic diagram of a charging circuit of an on-board charger according to an embodiment of this disclosure.

FIG. 3 is a schematic diagram of a charging circuit of an on-board charger according to an embodiment of this disclosure.

The charging circuit of an on-board charger includes a first power conversion circuit 101 and a second power conversion circuit 102.

The charging circuit of an on-board charger provided in this embodiment of this disclosure can operate in the following two operating modes: a charging mode and a driving mode.

In the charging mode, an electric vehicle is connected to an alternating current power supply, and a power battery pack is charged by using an on-board charger. In the charging mode, a first end of the first power conversion circuit 101 is connected to the alternating current power supply.

In the driving mode, the electric vehicle does not use an alternating current power supply to charge the power battery pack. It should be noted that the driving mode in this embodiment of this disclosure does not only mean that the electric vehicle is in a driving state, but means that the electric vehicle is in a state in which the power battery pack is not currently charged, that is, the driving mode is a non-charging mode. In the driving mode, no alternating current is input to the first end of the first power conversion circuit 101.

A second end of the first power conversion circuit 101 is connected to a first end of the second power conversion circuit 102, and output ends of the second power conversion circuit 102 include a high-voltage output end (represented by HV in the figure) and a first low-voltage output end (represented by LV1 in the figure).

The high-voltage output end HV charges the power battery pack of the electric vehicle, and the first low-voltage output end LV1 supplies power to a low-voltage system of the electric vehicle.

When the electric vehicle is in the charging mode, an alternating current is input from the first end of the first power conversion circuit 101. In this case, the first power conversion circuit 101 converts the alternating current input from the first end into a direct current and supplies the direct current to the second power conversion circuit. That is, the first power conversion circuit has a function of a power factor correction circuit and implements alternating current-direct current conversion. The second power conversion circuit 102 converts the direct current transmitted by the first power conversion circuit 101 into a high-voltage direct current to charge the power battery pack of the electric vehicle through the high-voltage output end HV, and converts the direct current transmitted by the first power conversion circuit 101 into a low-voltage direct current to supply power to the low-voltage system of the electric vehicle.

When the electric vehicle is in the driving mode, the low-voltage system of the electric vehicle is powered by the power battery pack. In this case, the high-voltage direct current provided by the power battery pack can be converted into a low-voltage direct current by the second power conversion circuit 102, and then the low-voltage direct current is supplied to the low-voltage system through the first low-voltage output end LV1, to form a first low-voltage direct current output.

The second power conversion circuit 102 can also convert a high voltage obtained from the power battery pack into a direct current through current conversion and transmit the direct current to the first power conversion circuit 101, and the first power conversion circuit 101 performs direct current conversion on the obtained direct current and then supplies the direct current to the low-voltage system, to form a second low-voltage direct current output. In this case, the first power conversion circuit 101 functions as a DC-DC conversion circuit.

In conclusion, the first power conversion circuit of the charging circuit provided in this embodiment of this disclosure functions as a power factor correction circuit when the electric vehicle is in the charging mode, and functions as a DC-DC conversion circuit when the electric vehicle is in the driving mode. Therefore, the first power conversion circuit has different functions when the electric vehicle is in different modes. In the solution provided in this embodiment of this disclosure, an output when the first power conversion circuit is used as a DC-DC conversion circuit is used as the second low-voltage direct current output, so that an additional DC-DC circuit is not needed. Therefore, dual redundant low-voltage direct current outputs are provided, and costs are reduced.

In some embodiments, the first power conversion circuit and the second power conversion circuit each include a switching transistor, and the charging circuit of an on-board charger further includes a controller (not shown in the figure). The controller implements the dual redundant low-voltage direct current outputs for the low-voltage system by controlling operating states of the switching transistors in the first power conversion circuit and the second power conversion circuit.

The controller may be an application-specific integrated circuit (ASIC), a programmable logic device (PLD), a digital signal processor (DSP), or a combination thereof. The PLD may be a complex PLD (CPLD), a field-programmable gate array (FPGA), general array logic (GAL), or any combination thereof. This is not limited in this embodiment of this disclosure.

In some embodiments, the controller is a controller of an on-board charger, and there may be one or more controllers. This is not limited in this embodiment of this disclosure. In other words, controllable switching transistors in the first power conversion circuit and the second power conversion circuit are controlled by a same controller or by a plurality of controllers.

The switching transistor may be any of the following: a relay, an insulated gate bipolar transistor (IGBT), a metal-oxide semiconductor field-effect transistor (MOSFET) or a MOS transistor, a silicon carbide (SiC) MOSFET, or the like. When the switching transistor is a MOS transistor, the switching transistor may be further a P-channel metal-oxide-semiconductor (PMOS) transistor or an N-channel metal-oxide-semiconductor (NMOS) transistor. This is not limited in this embodiment of this disclosure. In the following descriptions, that the switching transistor is an NMOS transistor is used as an example. When the switching transistor is a device of another type, an operating principle is similar. Details are not described again in this embodiment of this disclosure. When the switching transistor is an NMOS transistor, the NMOS transistor has a body diode. A cathode of the body diode is connected to a drain of the NMOS transistor, and an anode of the body diode is connected to a source of the NMOS transistor.

In some embodiments, the controller controls an operating state of the switching transistor by sending a PWM signal to the switching transistor.

The following describes an operating principle of the charging circuit with reference to a specific implementation of the charging circuit.

Charging Circuit Embodiment 2

Figure 4:
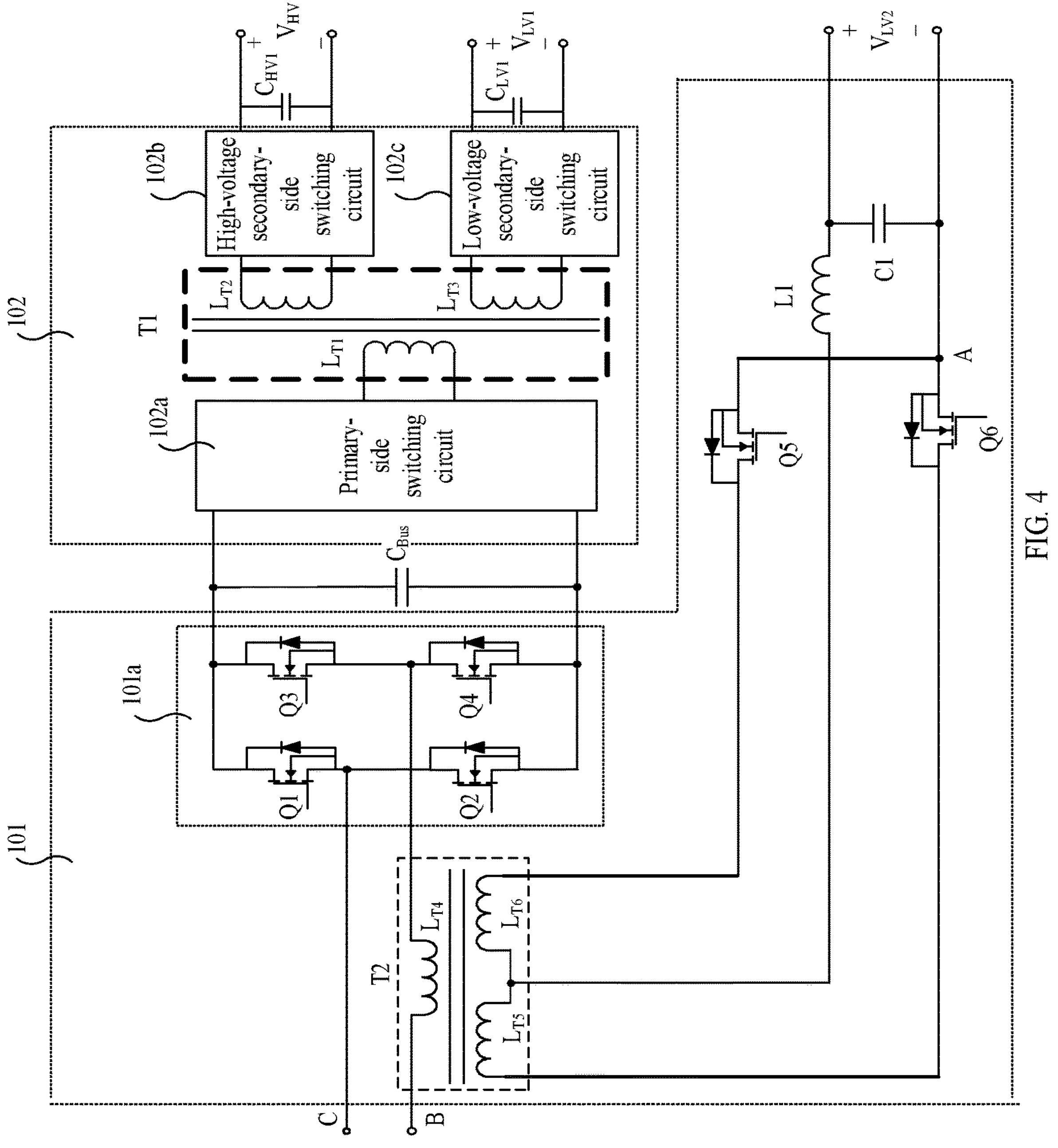
FIG. 4 is a schematic diagram of another charging circuit of an on-board charger according to an embodiment of this disclosure.

FIG. 4 is a schematic diagram of another charging circuit of an on-board charger provided in this embodiment of this disclosure.

A first power conversion circuit 101 of the charging circuit includes a full-bridge switching circuit 101*a*, a second transformer T2, a first switching transistor Q5, a second switching transistor Q6, a first capacitor C1, and a first inductor L1.

A second power conversion circuit 102 of the charging circuit includes a primary-side switching circuit 102*a*, a first transformer T1, a high-voltage secondary-side switching circuit 102*b*, and a low-voltage secondary-side switching circuit 102*c*.

The full-bridge switching circuit 101*a* includes two bridge arms, namely, a first bridge arm and a second bridge arm. An upper half bridge arm and a lower half bridge arm of each of the two bridge arms each include a switching transistor. The switching transistors of the full-bridge switching circuit are represented by Q1-Q4 in the figure.

An output end of the full-bridge switching circuit 101*a* is a first end of the first power conversion circuit 101. A middle point of the first bridge arm is connected in series to a primary-side winding of the second transformer T2 and then is connected to one port of the first end of the first power conversion circuit 101. In the figure, this port is represented by B. A middle point of the second bridge arm is connected to the other port of the first end of the first power conversion circuit 101. In the figure, this port is represented by C.

A first end of a secondary-side winding of the second transformer T2 is connected in series to the first switching transistor Q5 and then is connected to a first end point A. A second end of the secondary-side winding of the second transformer T2 is connected in series to the second switching transistor Q6 and then is connected to the first end point A. A central tap of the secondary-side winding of the second transformer T2 is sequentially connected in series to the first capacitor L1 and the first inductor C1 and then is connected to the first end point A. The first end point A is connected to one port of a second low-voltage output end, for example, to a negative output end in the figure. The other port of the second low-voltage output end, for example, a positive output end in the figure, is connected between the first inductor L1 and the first capacitor C1.

A first end of the primary-side switching circuit 102*a* is a first end of the second power conversion circuit 102, and a second end of the primary-side switching circuit 102*a* is connected to a primary-side winding $L_{T1}$ of the first transformer T1.

A high-voltage secondary-side winding $L_{T2}$ of the first transformer T1 is connected to a first end of the high-voltage secondary-side switching circuit 102*b*, and a second end of the high-voltage secondary-side switching circuit 102*b* is a high-voltage output end of the second power conversion circuit 102.

A low-voltage secondary-side winding $L_{T3}$ of the first transformer T1 is connected to a first end of the low-voltage secondary-side switching circuit 102*c*, and a second end of the low-voltage secondary-side switching circuit 102*c* is a first low-voltage output end of the second power conversion circuit 102.

The following describes in detail the operating principle of the charging circuit.

When an electric vehicle is in a charging mode, two ports B and C of the first end of the first power conversion circuit 101 are connected to an alternating current input, and the alternating current input is provided by an external device. In some embodiments, the external device may be a charging pile. In this case, a controller controls the first switch Q5 and the second switch Q6 to remain in a turn-off state.

After an alternating current passes through a primary-side winding $L_{T4}$ of the second transformer T2 and the full-bridge switching circuit 101*a*, the alternating current is converted into a direct current, and the direct current is transmitted to the first end of the primary-side switching circuit 102*a*. After the direct current passes through the primary-side switching circuit 102*a*, the primary-side winding $L_{T1}$, the high-voltage secondary-side winding $L_{T2}$, and the high-voltage secondary-side switching circuit 102*b*, energy is transmitted to the high-voltage output end to charge a power battery pack of the electric vehicle. In addition, after the direct current passes through the primary-side switching circuit 102*a*, the primary-side winding $L_{T1}$, the low-voltage secondary-side winding $L_{T3}$, and the low-voltage secondary-side switching circuit 102*c*, energy is transmitted to the first low-voltage output end to charge a low-voltage system of the electric vehicle.

Further, the primary-side switching circuit 102*a*, the high-voltage secondary-side switching circuit 102*b*, and the low-voltage secondary-side switching circuit 102*c* each include a switching transistor. The controller can convert a direct current input from the first end of the primary-side switching circuit 102*a* into an alternating current by controlling an operating state of the switching transistor, and then use the transformer T1 to enable a high-voltage alternating current to be input from the first end of the high-voltage secondary-side switching circuit 102*b*. The controller controls an operating state of the switching transistor in the high-voltage secondary-side switching circuit 102*b*, so that the high-voltage secondary-side switching circuit 102*b* rectifies the high-voltage alternating current into a high-voltage direct current and outputs the high-voltage direct current to the high-voltage output end. The controller further controls an operating state of the switching transistor in the low-voltage secondary-side switching circuit 102*c*, so that the low-voltage secondary-side switching circuit 102*c* rectifies a low-voltage alternating current into a low-voltage direct current and outputs the low-voltage direct current to the first low-voltage output end.

In this case, the first power conversion circuit 101 functions as a PFC circuit and can implement alternating current-direct current conversion.

When the electric vehicle is in a driving mode, no alternating current is input and the low-voltage system is powered by the power battery pack. In this case, the port B and the port C of the first end of the first power conversion circuit 101 are connected to form a circuit. The controller controls the switching transistor in the high-voltage secondary-side switching circuit 102*b*, to convert a high-voltage direct current output by the power battery pack into a high-voltage alternating current and then transmit the high-voltage alternating current to the first transformer T1. In this case, a low-voltage alternating current is input from the first end of the low-voltage secondary-side switching circuit 102*c*, and the controller controls the switching transistor in the low-voltage secondary-side switching circuit 102*c*, so that the low-voltage secondary-side switching circuit 102*c* rectifies the low-voltage alternating current into a low-voltage direct current and then outputs the low-voltage direct current, to form a first low-voltage direct current output.

The second end of the primary-side switching circuit 102*a* obtains an alternating current from the first transformer T1. In this case, the controller rectifies the alternating current into a direct current by controlling the switching transistor of the primary-side switching circuit 102*a* and then transmits the direct current to a second end of the first power conversion circuit 101. The first power conversion circuit 101 performs DC-DC conversion on the direct current and outputs a converted current to the second low-voltage output end, to form a second low-voltage direct current output.

The following describes in detail the operating principle of the charging circuit when the second low-voltage direct current output is formed.

Figure 5:
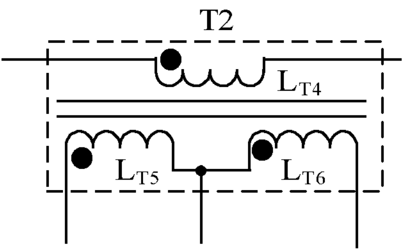
FIG. 5 is a schematic diagram of a second transformer according to an embodiment of this disclosure.
Figure 6:
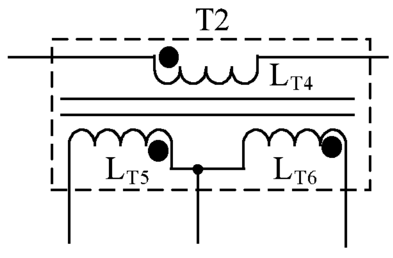
FIG. 6 is a schematic diagram of another second transformer according to an embodiment of this disclosure.

Refer to schematic diagrams of the second transformer T2 shown in FIG. 5 and FIG. 6.

Same-name ends of the primary-side winding $L_{T4}$ and secondary-side winding $L_{T5}$ and $L_{T6}$ of the second transformer T2 shown in FIG. 5 and those shown in FIG. 6 have different correspondences.

In the following, the transformer shown in FIG. 5 is first used as an example for descriptions.

Figure 7:
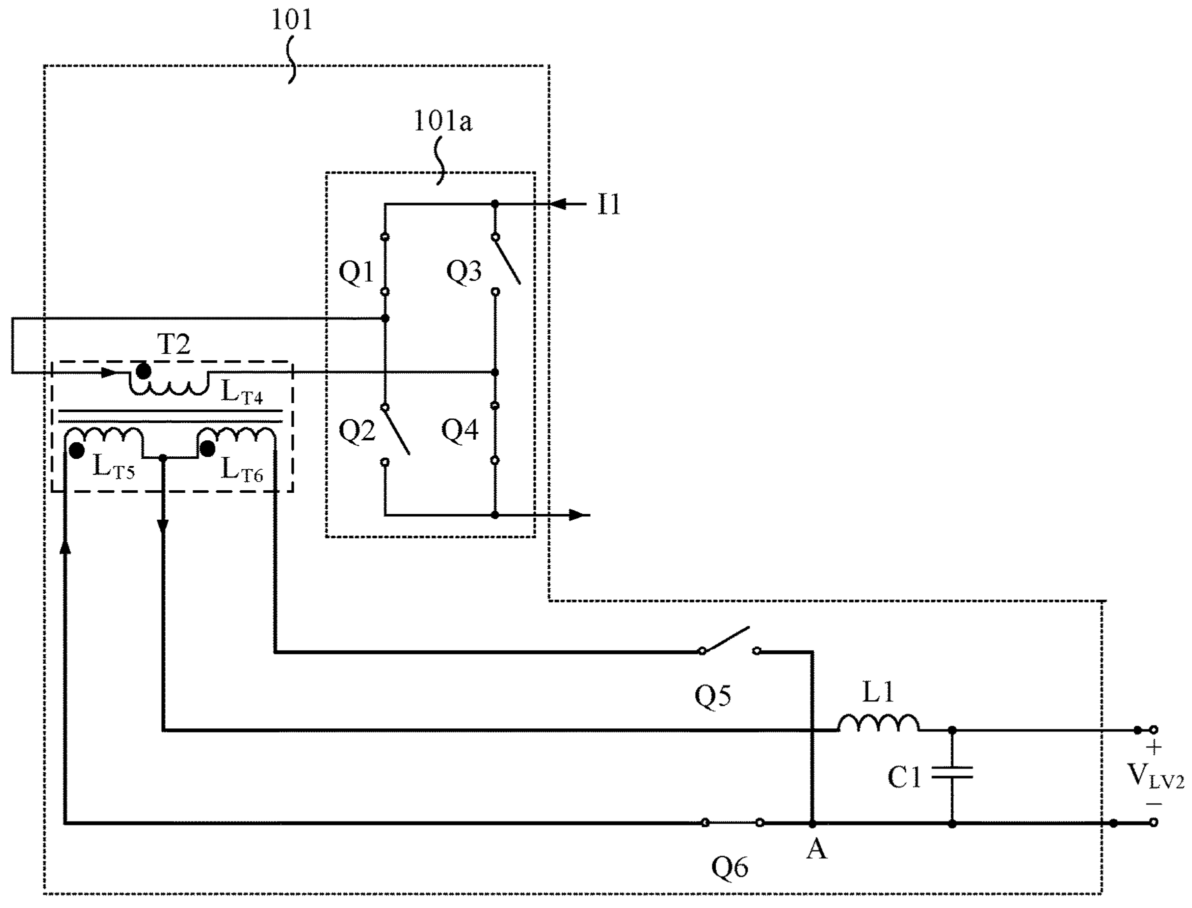
FIG. 7 is a schematic diagram of an operating principle of a first power conversion circuit when the second transformer shown in FIG. 5 is used.

FIG. 7 is a schematic diagram 1 of an operating principle of the first power conversion circuit when the second transformer shown in FIG. 5 is used.

When a direction of a current I1 input from the second end of the first power conversion circuit 101 is a direction shown in the figure, the controller controls the switching transistors Q1 and Q4 in the full-bridge switching circuit 101*a* to be turned on, and the switching transistors Q2 and Q3 in the full-bridge switching circuit 101*a* to be turned off. A direction of a current of the primary-side winding $L_{T4}$ of the second transformer T2 is from left to right shown in the figure, and a direction of an induced current of the secondary-side windings $L_{T5}$ and $L_{T6}$ of the second transformer T2 is from left to right shown in the figure. In this case, the controller controls the first switching transistor Q5 to be turned off and the second switching transistor Q6 to be turned on, so that a current output by the secondary-side winding $L_{T5}$ passes through a filter circuit formed by the first inductor L1 and the first capacitor C1 and then is transmitted to the second low-voltage output end, to form the second low-voltage direct current output.

Figure 8:
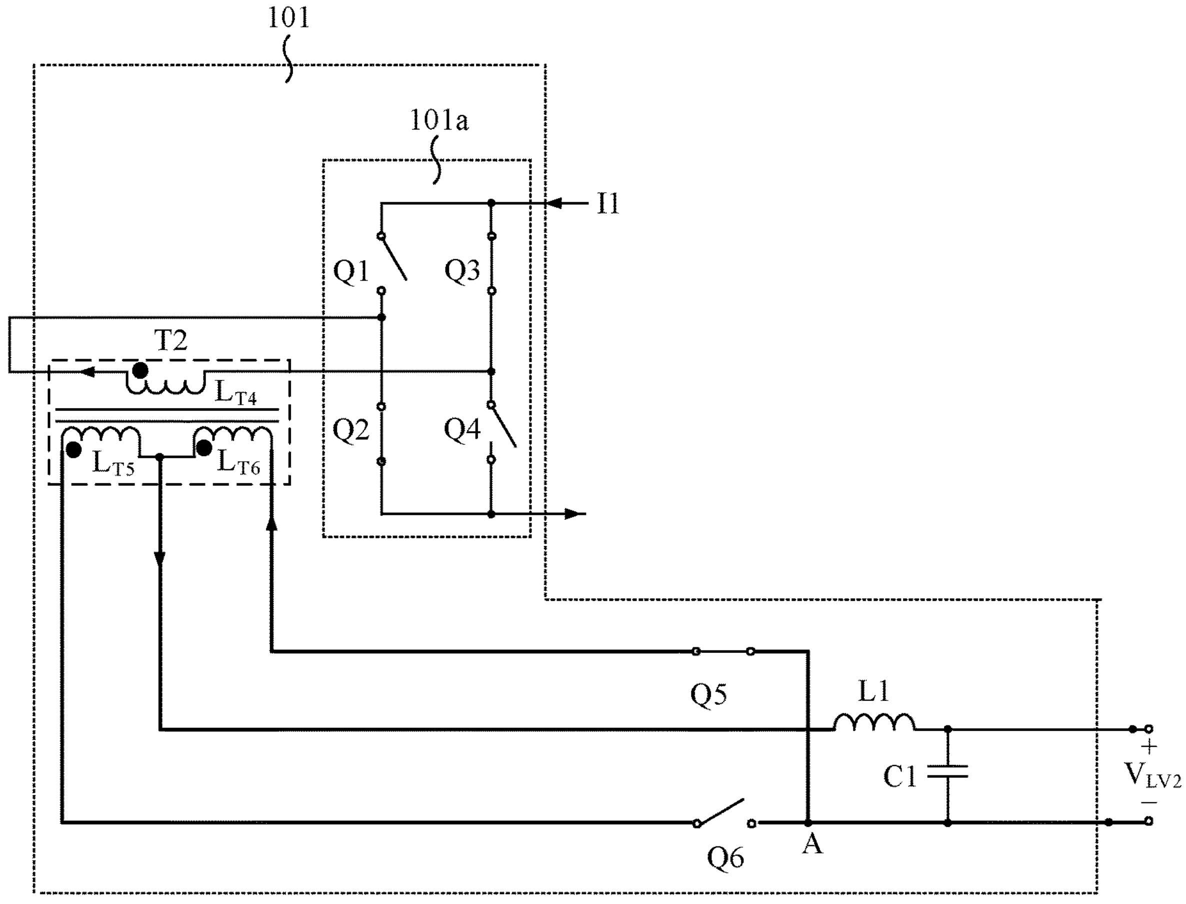
FIG. 8 is a schematic diagram of an operating principle of a first power conversion circuit when the second transformer shown in FIG. 5 is used.

FIG. 8 is a schematic diagram 2 of the operating principle of the first power conversion circuit when the second transformer shown in FIG. 5 is used.

When a direction of a current I1 input from the second end of the first power conversion circuit 101 is a direction shown in the figure, the controller controls the switching transistors Q2 and Q3 in the full-bridge switching circuit 101*a* to be turned on, and the switching transistors Q1 and Q4 in the full-bridge switching circuit 101*a* to be turned off. A direction of a current of the primary-side winding $L_{T4}$ of the second transformer T2 is from right to left shown in the figure, and a direction of an induced current of the secondary-side windings $L_{T5}$ and $L_{T6}$ of the second transformer T2 is from right to left shown in the figure. In this case, the controller controls the first switching transistor Q5 to be turned on and the second switching transistor Q6 to be turned off, so that a current output by the secondary-side winding $L_{T6}$ passes through the filter circuit formed by the first inductor L1 and the first capacitor C1 and then is transmitted to the second low-voltage output end, to form the second low-voltage direct current output.

Figure 9:
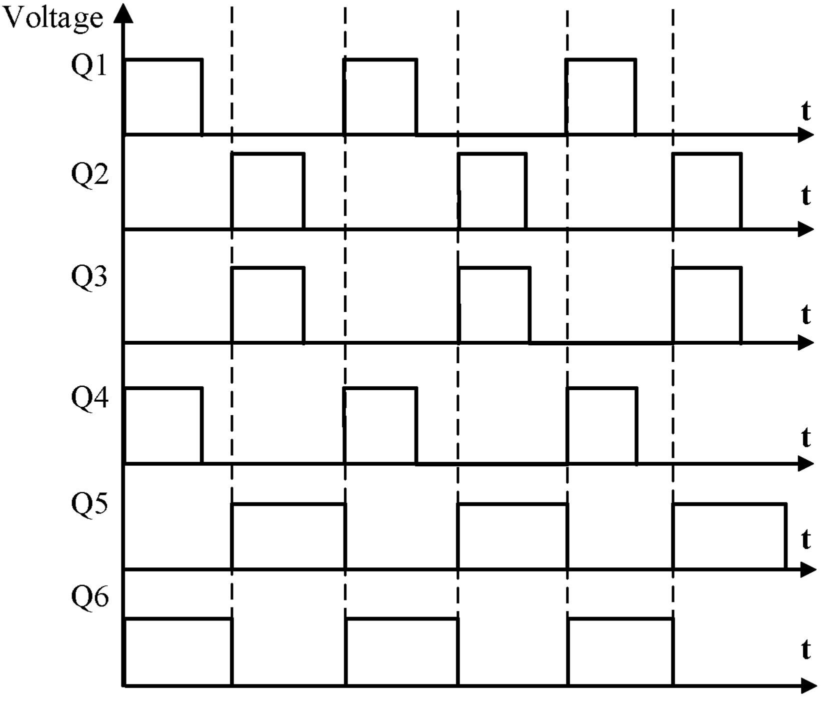
FIG. 9 is a sequence diagram of control signals of a controller according to an embodiment of this disclosure.

FIG. 9 is a sequence diagram 1 of control signals of the controller provided in this embodiment of this disclosure.

The controller controls the switching transistor Q1 of the upper half bridge arm of the first bridge arm and the switching transistor Q4 of the lower half bridge arm of the second bridge arm to be simultaneously turned on or turned off, controls the switching transistor Q2 of the lower half bridge arm of the first bridge arm and the switching transistor Q3 of the upper half bridge arm of the second bridge arm to be simultaneously turned on or turned off, and controls the switching transistor Q1 of the upper half bridge arm of the first bridge arm and the switching transistor Q2 of the lower half bridge arm of the first bridge arm not to be simultaneously turned on. A duty cycle of a control signal of each of Q1 to Q4 is not limited in this embodiment of this disclosure.

The controller can control complementary conduction between the first switching transistor Q5 and the second switching transistor Q6.

In addition, the controller can adjust an output voltage of the second low-voltage output end by adjusting a duty cycle of a control signal (PWM signal) of a switching transistor in the full-bridge switching circuit 101*a*.

In some embodiments, the controller can adjust a control signal of a switching transistor in the full-bridge switching circuit based on the output voltage of the second low-voltage output end and a preset voltage. The preset voltage may be determined by the low-voltage system of the electric vehicle. This is not limited in this embodiment of this disclosure.

Further, when the output voltage of the second low-voltage output end is less than the preset voltage, the controller increases a duty cycle of a control signal of each of switching transistors in the full-bridge switching circuit, namely, a duty cycle of a control signal of each of the switching transistors Q1 and Q2, so that the output voltage of the second low-voltage output end is increased to the preset voltage, and when the output voltage of the second low-voltage output end is greater than the preset voltage, the controller reduces the duty cycle of the control signal of each switching transistor in the full-bridge switching circuit, namely, the duty cycle of the control signal of each of the switching transistors Q1 and Q2, so that the output voltage of the second low-voltage output end is reduced to the preset voltage.

Further, the controller may adjust a duty cycle of a control signal of a controllable switching transistor in the primary-side switching circuit 102*a* and/or the high-voltage secondary-side switching circuit 102*b*, so that a direct current voltage output by the primary-side switching circuit 102*a* to the first power conversion circuit 101 remains stable. In this case, the direct current voltage obtained by the full-bridge switching circuit 101*a* from the first power conversion circuit 101 is relatively stable, and the output voltage of the second low-voltage output end can be adjusted only by adjusting a duty cycle of a drive signal of the controllable switching transistor in the first power conversion circuit 101.

In some embodiments, the output voltage of the second low-voltage output end may be detected in real time by a voltage sensor and a detection result is transmitted to the controller.

In the foregoing description, the second transformer shown in FIG. 5 is used as an example for description. In the following, the second transformer shown in FIG. 6 is used as an example for description.

Figure 10:
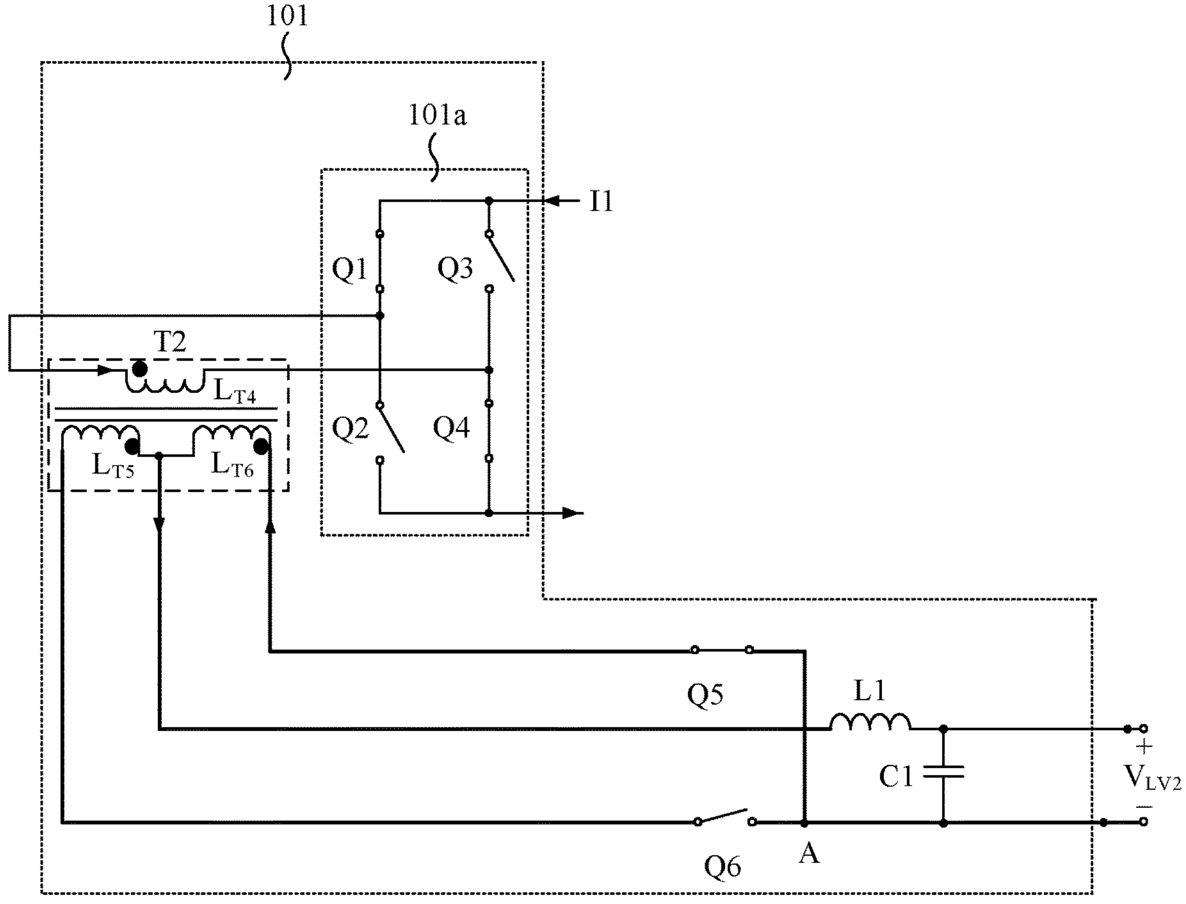
FIG. 10 is a schematic diagram of an operating principle of a first power conversion circuit when the second transformer shown in FIG. 6 is used.

FIG. 10 is a schematic diagram 1 of an operating principle of the first power conversion circuit when the second transformer shown in FIG. 6 is used.

When a direction of a current I1 input from the second end of the first power conversion circuit 101 is a direction shown in the figure, the controller controls the switching transistors Q1 and Q4 in the full-bridge switching circuit 101*a* to be turned on, and the switching transistors Q2 and Q3 in the full-bridge switching circuit 101*a* to be turned off. A direction of a current of the primary-side winding $L_{T4}$ of the second transformer T2 is from left to right shown in the figure, and a direction of an induced current of the secondary-side windings $L_{T5}$ and $L_{T6}$ of the second transformer T2 is from right to left shown in the figure. In this case, the controller controls the first switching transistor Q5 to be turned on and the second switching transistor Q6 to be turned off, so that a current output by the secondary-side winding $L_{T6}$ passes through the filter circuit formed by the first inductor L1 and the first capacitor C1 and then is transmitted to the second low-voltage output end, to form the second low-voltage direct current output.

Figure 11:
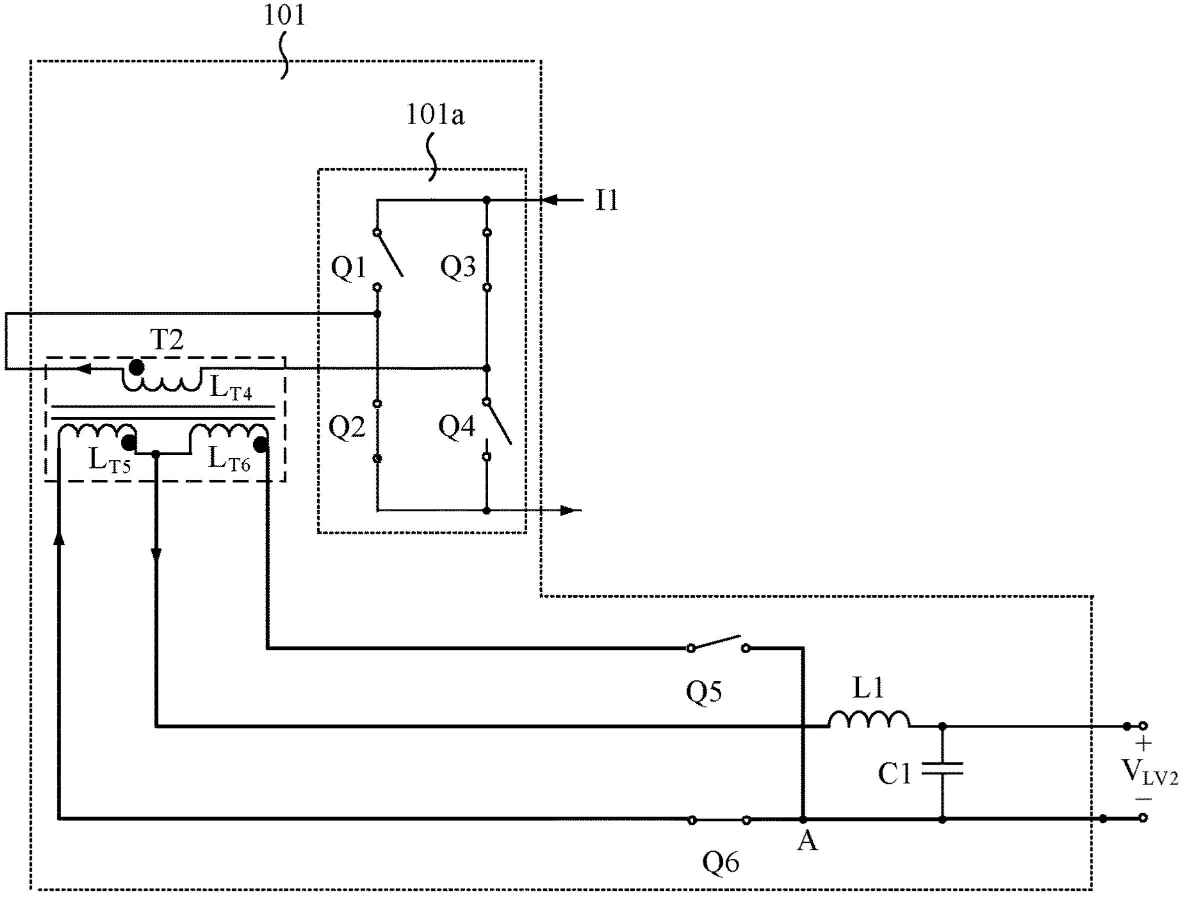
FIG. 11 is a schematic diagram of an operating principle of a first power conversion circuit when the second transformer shown in FIG. 6 is used.

FIG. 11 is a schematic diagram 2 of the operating principle of the first power conversion circuit when the second transformer shown in FIG. 6 is used.

When a direction of a current I1 input from the second end of the first power conversion circuit 101 is a direction shown in the figure, the controller controls the switching transistors Q2 and Q3 in the full-bridge switching circuit 101*a* to be turned on, and the switching transistors Q1 and Q4 in the full-bridge switching circuit 101*a* to be turned off. A direction of a current of the primary-side winding $L_{T4}$ of the second transformer T2 is from right to left shown in the figure, and a direction of an induced current of the secondary-side windings $L_{T5}$ and $L_{T6}$ of the second transformer T2 is from right to left shown in the figure. In this case, the controller controls the first switching transistor Q5 to be turned off and the second switching transistor Q6 to be turned on, so that a current output by the secondary-side winding $L_{T5}$ passes through the filter circuit formed by the first inductor L1 and the first capacitor C1 and then is transmitted to the second low-voltage output end, to form the second low-voltage direct current output.

Figure 12:
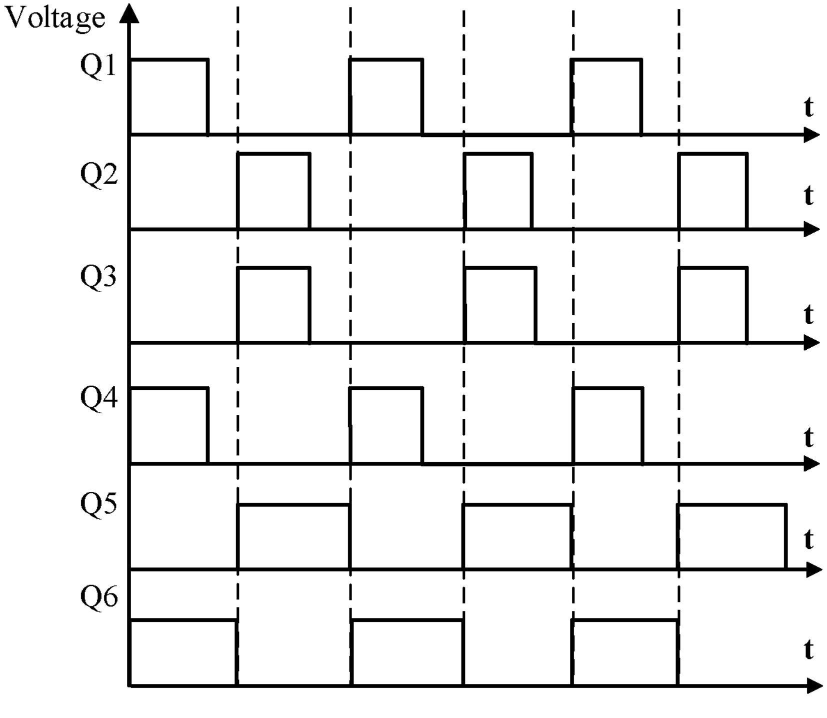
FIG. 12 is a sequence diagram of control signals of a controller according to an embodiment of this disclosure.

FIG. 12 is a sequence diagram 2 of control signals of the controller provided in this embodiment of this disclosure.

A difference between FIG. 12 and FIG. 9 lies in that waveforms of control signals of the first switching transistor Q5 and the second switching transistor Q6 sent by the controller are opposite.

Still refer to FIG. 4. The charging circuit further includes a secondary-side high-voltage capacitor $C_{HV1}$ and a secondary-side low-voltage capacitor $C_{LV1}$.

The secondary-side high-voltage capacitor $C_{HV1}$ is connected in parallel between a positive output end and a negative output end of the high-voltage output end, to reduce voltage fluctuation of the high-voltage output end.

The secondary-side low-voltage capacitor $C_{LV1}$ is connected in parallel between a positive output end and a negative output end of the low-voltage output end, to reduce voltage fluctuation of the low-voltage output end.

The charging circuit further includes a bus capacitor $C_{Bus}$ The bus capacitor $C_{Bus}$ is connected in parallel between two ports of the second end of the first power conversion circuit 101, and is configured to reduce fluctuation of a direct current voltage transmitted between the first power conversion circuit 101 and the second power conversion circuit 102.

Figure 13:
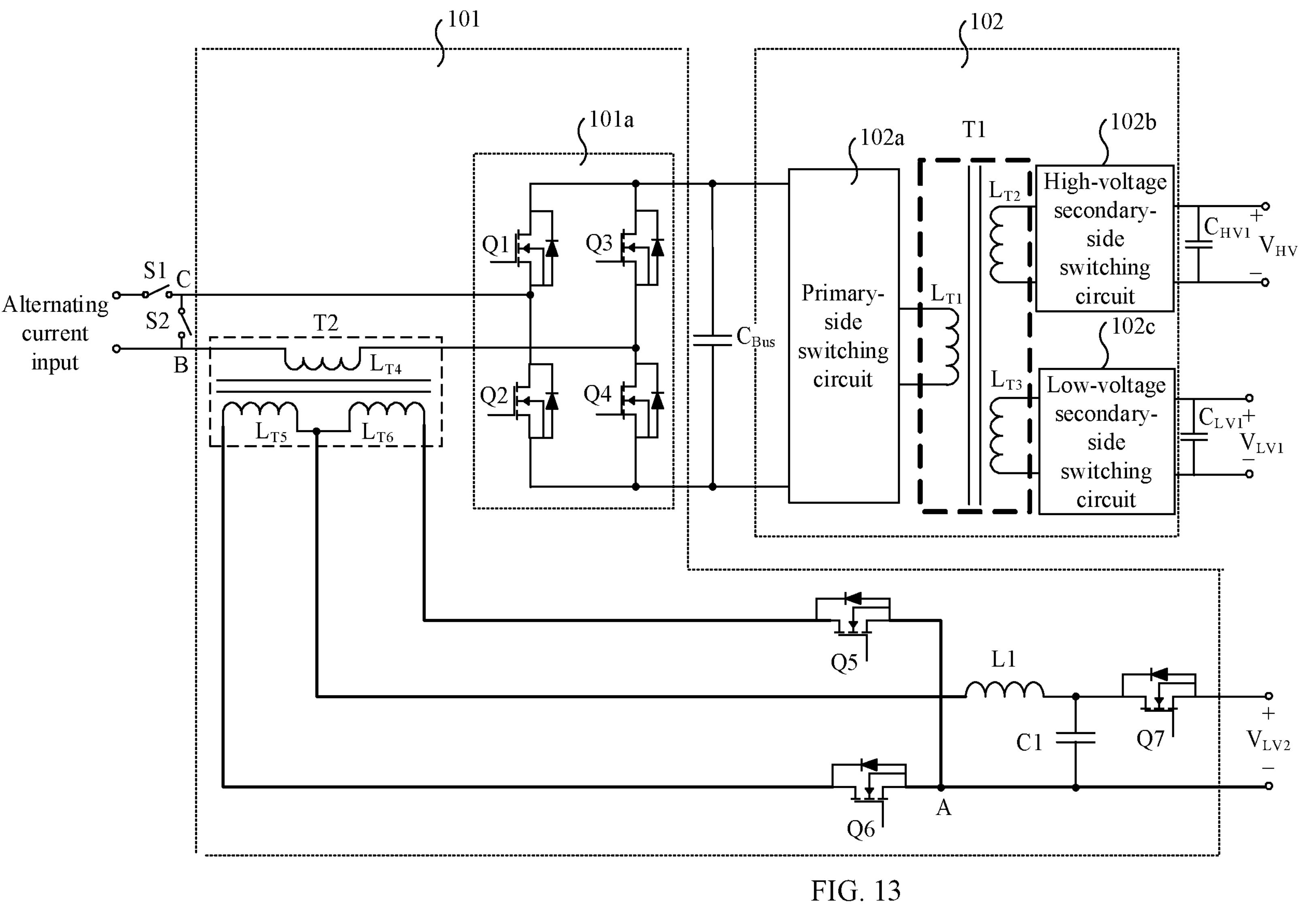
FIG. 13 is a schematic diagram of still another charging circuit of an on-board charger according to an embodiment of this disclosure.

FIG. 13 is a schematic diagram of still another charging circuit of an on-board charger provided in this embodiment of this disclosure.

A difference between the charging circuit shown in FIG. 13 and the charging circuit shown in FIG. 4 lies in that the charging circuit shown in FIG. 13 further includes a first switch S1 and a second switch S2, and the first power conversion circuit 101 further includes a third switching transistor Q7.

A first end of the third switching transistor Q7 is connected between the first inductor L1 and the first capacitor C1, and a second end of the third switching transistor Q7 is connected to a positive output end of the second low-voltage output end.

In this case, when the electric vehicle is in the charging mode, the controller controls the third switching transistor Q3 to be turned off, so that the second low-voltage output end has no output, and when the electric vehicle is in the driving mode, the controller controls the third switching transistor Q3 to be turned on.

In some other embodiments, the third switching transistor Q3 may not be disposed. In this case, when the electric vehicle is in the charging mode, the controller controls the first switching transistor Q5 and the second switching transistor Q6 to be turned off, so that the second low-voltage output end has no output.

A first end of the first switch S1 is connected to a first alternating current port, and a second end of the first switch S1 is connected to a first end of the second switch S2. In the figure, the second end of the first switch S1 is represented by C. The middle point of the first bridge arm of the full-bridge switching circuit 101*a* is connected in series to the primary-side winding $L_{T4}$ of the second transformer and then is connected to a second end of the second switch S2. In the figure, the second end of the second switch S2 is represented by B. The second end of the second switch S2 is connected to a second alternating current port. The first end of the second switch S2 is also connected to the middle point of the second bridge arm of the full-bridge switching circuit 101*a*.

When the electric vehicle is in the charging mode, the controller controls the first switch S1 to be turned on and the second switch S2 to be turned off, so that the two ports of the first end of the first power conversion circuit 101 are respectively connected to the two alternating current ports. In this way, an alternating current is input to the first power conversion circuit 101.

When the electric vehicle is in the driving mode, the controller controls the first switch S1 to be turned off and the second switch S2 to be turned on. In this way, the first end of the first power conversion circuit 101 is disconnected from an alternating current port, and the middle point of the first bridge arm of the full-bridge switching circuit 101*a* is connected in series to the primary-side winding $L_{T4}$ of the second transformer and then is connected to the middle point of the second bridge arm, to form a circuit.

The first switch S1 and the second switch S2 may be relays, or other controllable switches that can be used in an alternating current circuit. This is not limited in this embodiment of this disclosure.

In the foregoing descriptions, that each low-voltage direct current output corresponds to one low-voltage output end is used as an example for description. To be specific, the charging circuit includes the following two low-voltage output ends: a first low-voltage output end and a second low-voltage output end. In some other embodiments, the first low-voltage output end and the second low-voltage output end may be connected in parallel. In this case, the charging circuit presents a low-voltage output end for an externally connected low-voltage system of the electric vehicle. This is described in detail below with reference to an accompanying drawing.

Figure 14:
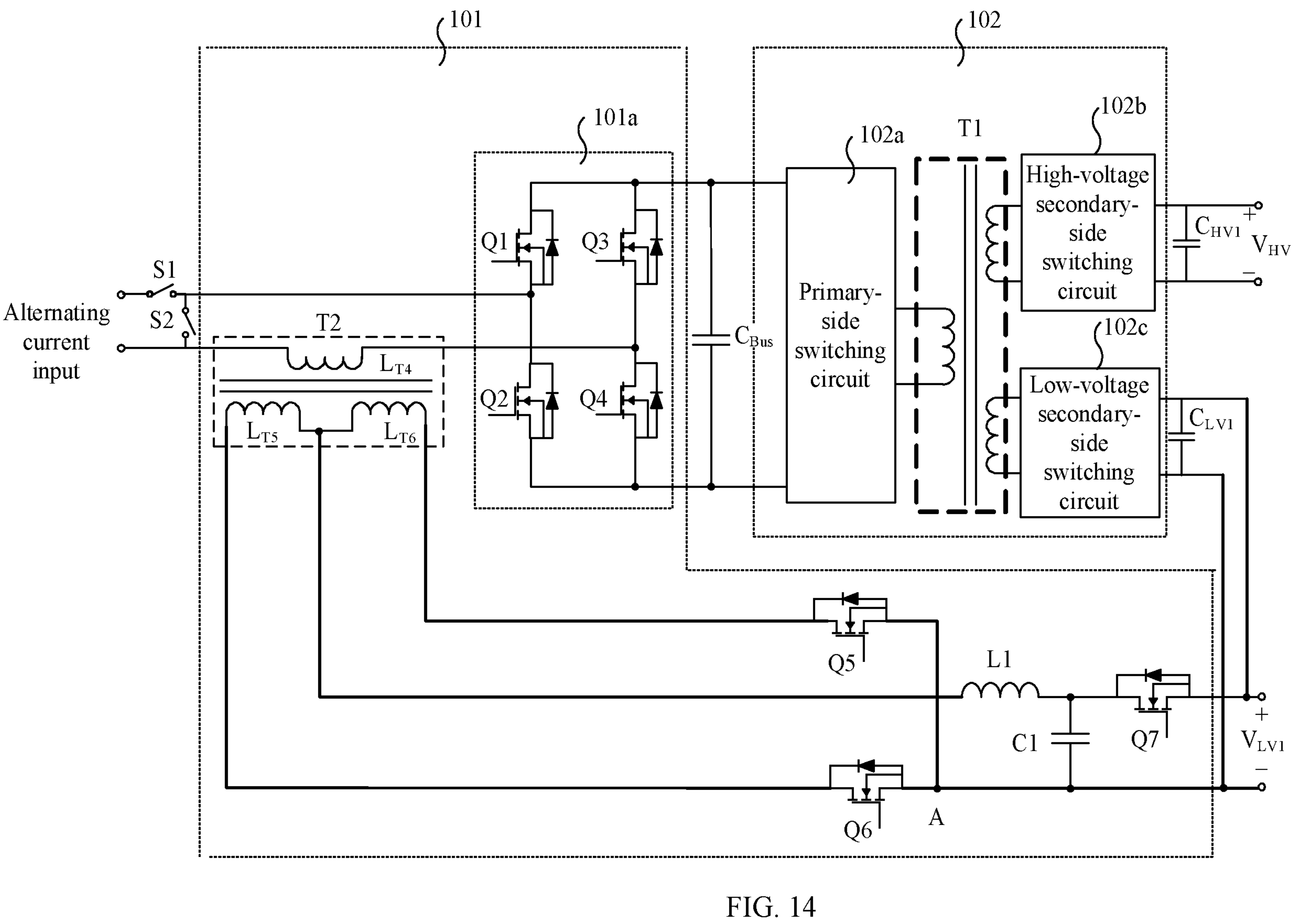
FIG. 14 is a schematic diagram of yet another charging circuit of an on-board charger according to an embodiment of this disclosure.

FIG. 14 is a schematic diagram of yet another charging circuit of an on-board charger provided in this embodiment of this disclosure.

In this case, the positive output end of the second low-voltage output end is connected to a positive output end of the first low-voltage output end, and a negative output end of the second low-voltage output end is connected to a negative output end of the first low-voltage output end. In this case, the two low-voltage direct current outputs are connected in parallel, to jointly supply power to the low-voltage system of the electric vehicle.

There may be one or more controllers in this embodiment of this disclosure.

In some embodiments, the switching transistors of the first power conversion circuit are controlled by one controller, and the switching transistors of the second power conversion circuit are controlled by another controller.

In some other embodiments, switching transistors connected to a high voltage are controlled by one controller, that is, the switching transistors in the full-bridge switching circuit 101*a*, the primary-side switching circuit 102*a*, and the high-voltage secondary-side switching circuit 102*b* are controlled by one controller, and switching transistors connected to a low voltage is controlled by another controller, that is, the low-voltage secondary-side switching circuit, the first switching transistor Q5, and the second switching transistor Q6 are controlled by another controller.

In conclusion, the first power conversion circuit of the charging circuit provided in this embodiment of this disclosure functions as a power factor correction circuit when the electric vehicle is in the charging mode, and functions as a DC-DC conversion circuit when the electric vehicle is in the driving mode. Therefore, the first power conversion circuit has different functions when the electric vehicle is in different modes. An output when the first power conversion circuit is used as a DC-DC conversion circuit is used as the second low-voltage direct current output, so that an additional DC-DC circuit is not needed. Therefore, the charging circuit provided in this embodiment of this disclosure provides dual redundant low-voltage direct current outputs, and costs are reduced.

The following describes the operating principle of the charging circuit with reference to another specific implementation of the charging circuit.

Charging Circuit Embodiment 3

Figure 15:
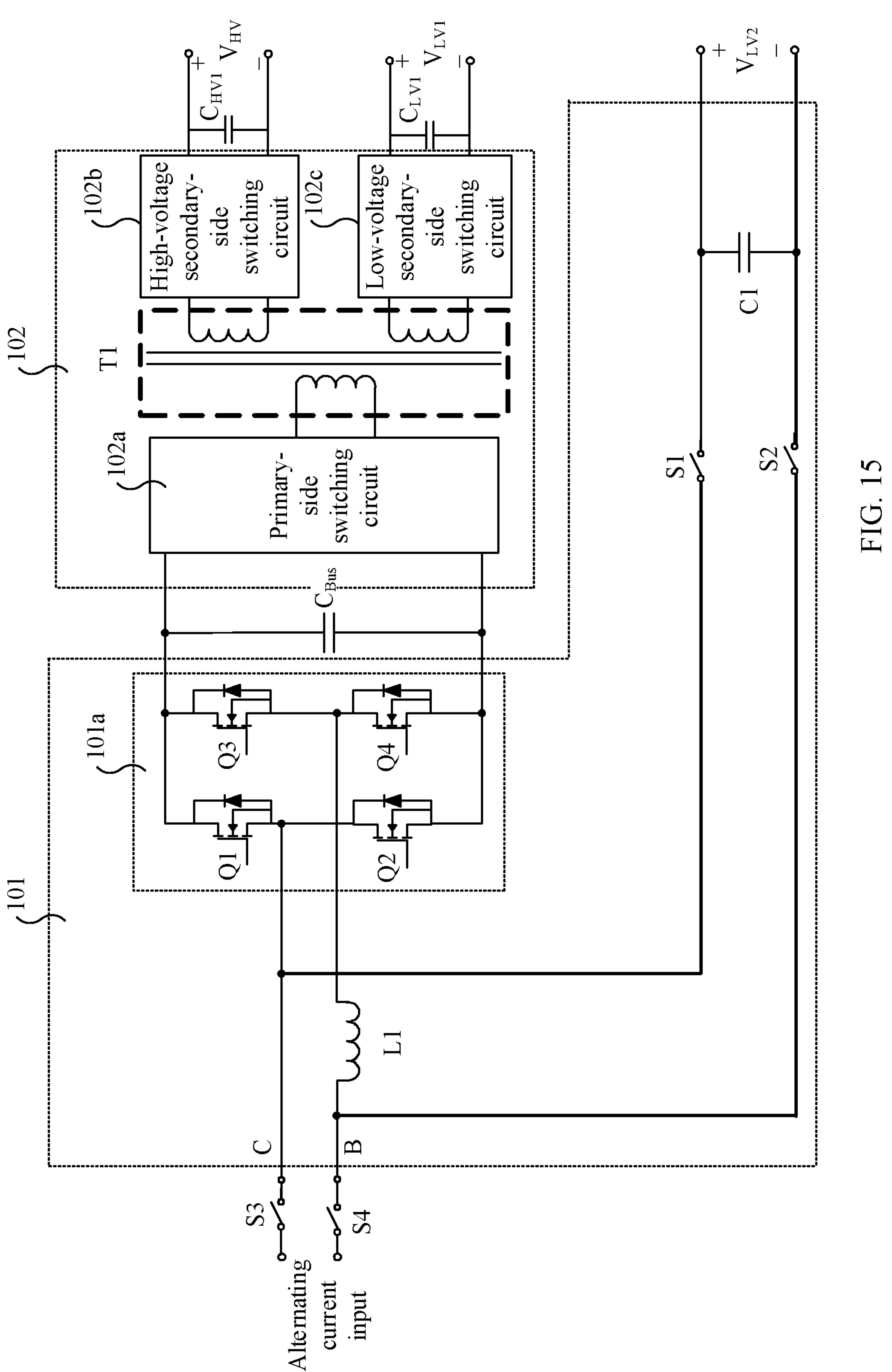
FIG. 15 is a schematic diagram of another charging circuit of an on-board charger according to an embodiment of this disclosure.

FIG. 15 is a schematic diagram of another charging circuit of an on-board charger provided in this embodiment of this disclosure.

A first power conversion circuit 101 of the charging circuit includes a full-bridge switching circuit 101*a*, a first inductor L1, a first switch S1, a second switch S2, and a first capacitor C1.

A second power conversion circuit 102 of the charging circuit includes a primary-side switching circuit 102*a*, a first transformer T1, a high-voltage secondary-side switching circuit 102*b*, and a low-voltage secondary-side switching circuit 102*c*. The second power conversion circuit 102 has the same structure and operating principle as the second power conversion circuit in the charging circuit embodiment 2. Details are not described herein again in this embodiment of this disclosure.

An output end of the full-bridge switching circuit 101*a* is a second end of the first power conversion circuit 101.

The full-bridge switching circuit 101*a* includes two bridge arms. An upper half bridge arm and a lower half bridge arm of each of the two bridge arms each include a switching transistor. A middle point of a first bridge arm is connected to a first end of the first switch S1, and the middle point of the first bridge arm is also connected to a port of a first end of the first power conversion circuit 101, where the port is represented by a port C in the figure. A middle point of the second bridge arm is connected in series to the first inductor L1 and then connected to the other port of the first end of the first power conversion circuit 101, where the other port is represented by a port B in the figure.

The middle point of the second bridge arm is connected in series to the first inductor L1 and then is connected to a first end of the second switch S2, and a second end of the second switch S2 is connected to a port of a second low-voltage output end, for example, to a negative output end as shown in the figure. A second end of the first switch S1 is connected to the other port of the second low-voltage output end, for example, to a positive output end as shown in the figure.

The first capacitor C1 is connected in parallel between the second end of the first switch S1 and the second end of the second switch S2. The first capacitor C1 is configured to reduce fluctuation of an output voltage of the second low-voltage output end, to obtain a stable direct current voltage.

The charging circuit further includes a third switch S3 and a fourth switch S4.

A first end of the third switch S3 is connected to a first alternating current port, and a second end of the third switch S3 is connected to the port C of the first end of the first power conversion circuit.

A first end of the fourth switch S4 is connected to a second alternating current port, and a second end of the fourth switch S4 is connected to the port B of the first end of the first power conversion circuit.

The third switch S3 and the fourth switch S4 may be relays, or other controllable switches that can be used in an alternating current circuit. This is not limited in this embodiment of this disclosure.

The following describes an operating principle of the charging circuit.

When an electric vehicle is in a charging mode, a controller controls the first switch S1 and the second switch S2 to be turned off, the third switch S3 and the fourth switch S4 to be turned on, and the two ports B and C of the first end of the first power conversion circuit 101 are connected to an alternating current input, where the alternating current input is provided by an external charging device.

After an alternating current passes through the first inductor L1 and the full-bridge switching circuit 101*a*, the alternating current is converted into a direct current, and the direct current is transmitted to a first end of the primary-side switching circuit 102*a*. After the direct current passes through the primary-side switching circuit 102*a*, a primary-side winding $L_{T1}$, a high-voltage secondary-side winding $L_{T2}$, and the high-voltage secondary-side switching circuit 102*b*, energy is transmitted to a high-voltage output end to charge a power battery pack of the electric vehicle. In addition, after the direct current passes through the primary-side switching circuit 102*a*, the primary-side winding $L_{T1}$, a low-voltage secondary-side winding $L_{T3}$, and the low-voltage secondary-side switching circuit 102*c*, energy is transmitted to a first low-voltage output end to charge a low-voltage system of the electric vehicle.

In this case, the first power conversion circuit 101 functions as a PFC circuit and can implement alternating current-direct current conversion.

When the electric vehicle is in a driving mode, no alternating current is input and the low-voltage system is powered by the power battery pack. In this case, the controller controls the first switch S1 and the second switch S2 to be turned on, and controls the third switch S3 and the fourth switch S4 to be turned off. The controller controls a switching transistor in the high-voltage secondary-side switching circuit 102*b*, to convert a high-voltage direct current output by the power battery pack into a high-voltage alternating current and then transmit the high-voltage alternating current to the first transformer T1. In this case, a low-voltage alternating current is input from a first end of the low-voltage secondary-side switching circuit 102*c*, and the controller controls a switching transistor in the low-voltage secondary-side switching circuit 102*c*, so that the low-voltage secondary-side switching circuit 102*c* rectifies the low-voltage alternating current into a low-voltage direct current and then outputs the low-voltage direct current, to form a first low-voltage direct current output.

A second end of the primary-side switching circuit 102*a* obtains an alternating current from the first transformer T1. In this case, the controller rectifies the alternating current into a direct current by controlling a switching transistor of the primary-side switching circuit 102*a* and then transmits the direct current to the second end of the first power conversion circuit 101. The first power conversion circuit 101 performs DC-DC conversion on the direct current and outputs a converted current to the second low-voltage output end, to form a second low-voltage direct current output.

The following describes the operating principle of the charging circuit when the second low-voltage direct current output is formed.

Figure 16:
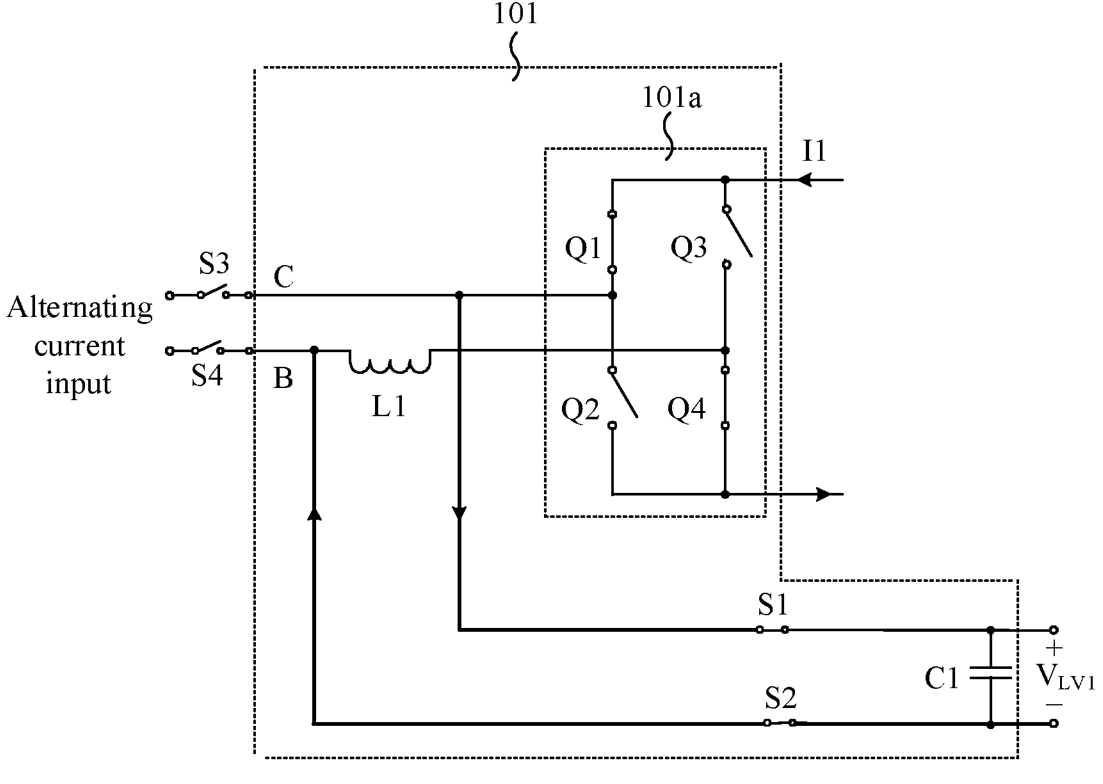
FIG. 16 is a schematic diagram of an operating principle of a first power conversion circuit according to an embodiment of this disclosure.
Figure 17:
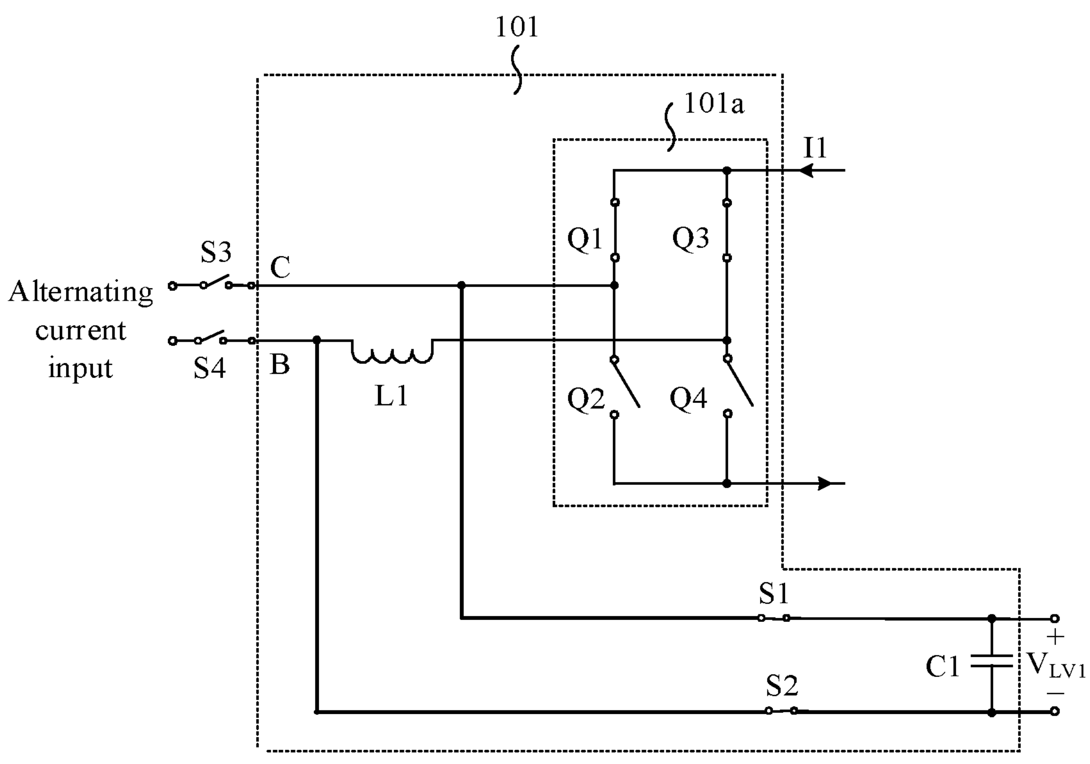
FIG. 17 is a schematic diagram of an operating principle of a first power conversion circuit according to an embodiment of this disclosure.

Refer to FIG. 16 and FIG. 17. FIG. 16 is a schematic diagram 3 of an operating principle of the first power conversion circuit provided in this embodiment of this disclosure. FIG. 17 is a schematic diagram 4 of an operating principle of the first power conversion circuit provided in this embodiment of this disclosure.

When a direction of a current I1 input from the second end of the first power conversion circuit 101 is a direction shown in the figure, the controller controls switching transistors Q1 and Q4 in the full-bridge switching circuit 101*a* to be turned on, and switching transistors Q2 and Q3 in the full-bridge switching circuit 101*a* to be turned off. This corresponds to an operating state shown in FIG. 16.

In this case, the first power conversion circuit 101 is equivalent to a Buck (step-down) circuit, and can implement the DC-DC conversion. A current passes through the switching transistor Q1 and the first switch S1, the first inductor L1 stores energy, and the first capacitor C1 is charged and supplies power to the low-voltage system through the second low-voltage output end.

Then, the controller keeps the switching transistor Q1 to be turned on and the switching transistor Q2 to be turned off, and controls the switching transistor Q3 to be turned on and the switching transistor Q4 to be turned off. This corresponds to an operating state shown in FIG. 17. In this case, the first inductor L1 discharges, and a current of the first inductor L1 passes through the switching transistor Q3, the switching transistor Q1, and the first switch S1, and flows to a positive output end of the second low-voltage output end. In addition, the first capacitor C1 also discharges. In this case, the output voltage of the second low-voltage output end is jointly maintained by the first inductor L1 and the first capacitor C1 together.

The controller controls the switching transistors Q3 and Q4 to be alternately turned on, so that the second low-voltage output end generates a low-voltage output. The capacitor C1 can be further configured to reduce fluctuation of the output voltage of the second low-voltage output end.

Figure 18:
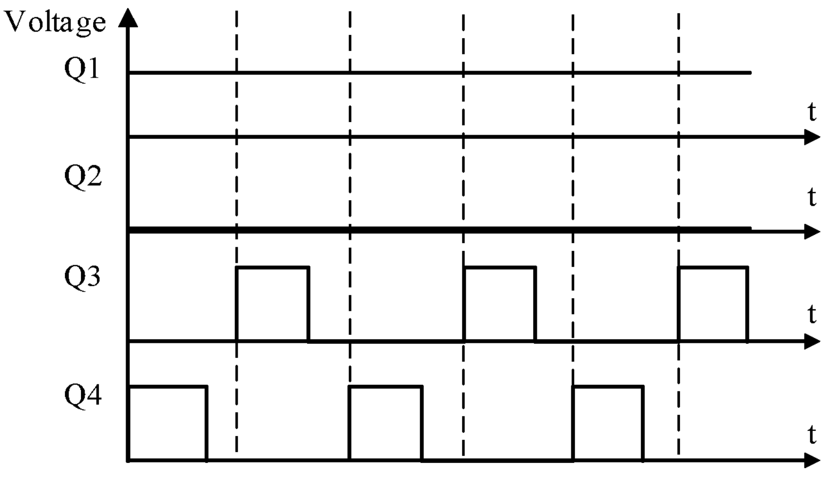
FIG. 18 is a sequence diagram of control signals of a controller according to an embodiment of this disclosure.

FIG. 18 is a sequence diagram 3 of control signals of the controller provided in this embodiment of this disclosure.

The controller controls the switching transistor Q1 of the upper half bridge arm of the first bridge arm to maintain a turn-on state, controls the switching transistor Q2 of the lower half bridge arm of the first bridge arm to maintain a turn-off state, and controls the switching transistor Q3 of the upper half bridge arm of the second bridge arm and the switching transistor Q4 of the lower half bridge arm of the second bridge arm to be alternately turned on. A duty cycle of a control signal of each of the switching transistor Q3 and the switching transistor Q4 is not limited in this embodiment of this disclosure.

The controller can adjust the output voltage of the second low-voltage output end by adjusting the duty cycle of the control signal (PWM signal) of each of the switching transistors Q3 and Q4 in the full-bridge switching circuit 101*a*.

In some embodiments, the controller can adjust the control signals of the switching transistors Q3 and Q4 in the full-bridge switching circuit based on the output voltage of the second low-voltage output end and a preset voltage. The preset voltage may be determined by the low-voltage system of the electric vehicle. This is not limited in this embodiment of this disclosure.

Further, when the output voltage of the second low-voltage output end is less than the preset voltage, the controller increases a duty cycle of a control signal of each of switching transistors in the full-bridge switching circuit, namely, a duty cycle of a control signal of each of the switching transistors Q3 and Q4, so that the output voltage of the second low-voltage output end is increased to the preset voltage, and when the output voltage of the second low-voltage output end is greater than the preset voltage, the controller reduces the duty cycle of the control signal of each switching transistor in the full-bridge switching circuit, namely, the duty cycle of the control signal of each of the switching transistors Q3 and Q4, so that the output voltage of the second low-voltage output end is reduced to the preset voltage.

Further, the controller can adjust a duty cycle of a control signal of a controllable switching transistor in the primary-side switching circuit 102*a* and/or the high-voltage secondary-side switching circuit 102*b*, so that a direct current voltage output by the primary-side switching circuit 102*a* to the first power conversion circuit 101 remains stable. In this case, the direct current voltage obtained by the full-bridge switching circuit 101*a* from the first power conversion circuit 101 is relatively stable. Therefore, the output voltage of the second low-voltage output end can be adjusted only by adjusting duty cycles of the drive signals of the controllable switching transistor Q3 and Q4 in the first power conversion circuit 101.

In some embodiments, the output voltage of the second low-voltage output end can be detected in real time by a voltage sensor and a detection result is transmitted to the controller.

Still refer to FIG. 15. The charging circuit further includes a secondary-side high-voltage capacitor $C_{HV1}$ and a secondary-side low-voltage capacitor $C_{LV1}$.

The secondary-side high-voltage capacitor $C_{HV1}$ is connected in parallel between a positive output end and a negative output end of the high-voltage output end, to reduce voltage fluctuation of the high-voltage output end.

The secondary-side low-voltage capacitor $C_{LV1}$ is connected in parallel between a positive output end and a negative output end of the low-voltage output end, to reduce voltage fluctuation of the low-voltage output end.

The charging circuit further includes a bus capacitor $C_{Bus}$ The bus capacitor $C_{Bus}$ is connected in parallel between two ports of the second end of the first power conversion circuit 101, and is configured to reduce fluctuation of a direct current voltage transmitted between the first power conversion circuit 101 and the second power conversion circuit 102.

In the foregoing descriptions, that each low-voltage direct current output corresponds to one low-voltage output end is used as an example. To be specific, the charging circuit includes the following two low-voltage output ends: the first low-voltage output end and the second low-voltage output end. In some other embodiments, the first low-voltage output end and the second low-voltage output end may be connected in parallel. In this case, the charging circuit presents a low-voltage output end for an externally connected low-voltage system of the electric vehicle. This is described in detail below with reference to an accompanying drawing.

Figure 19:
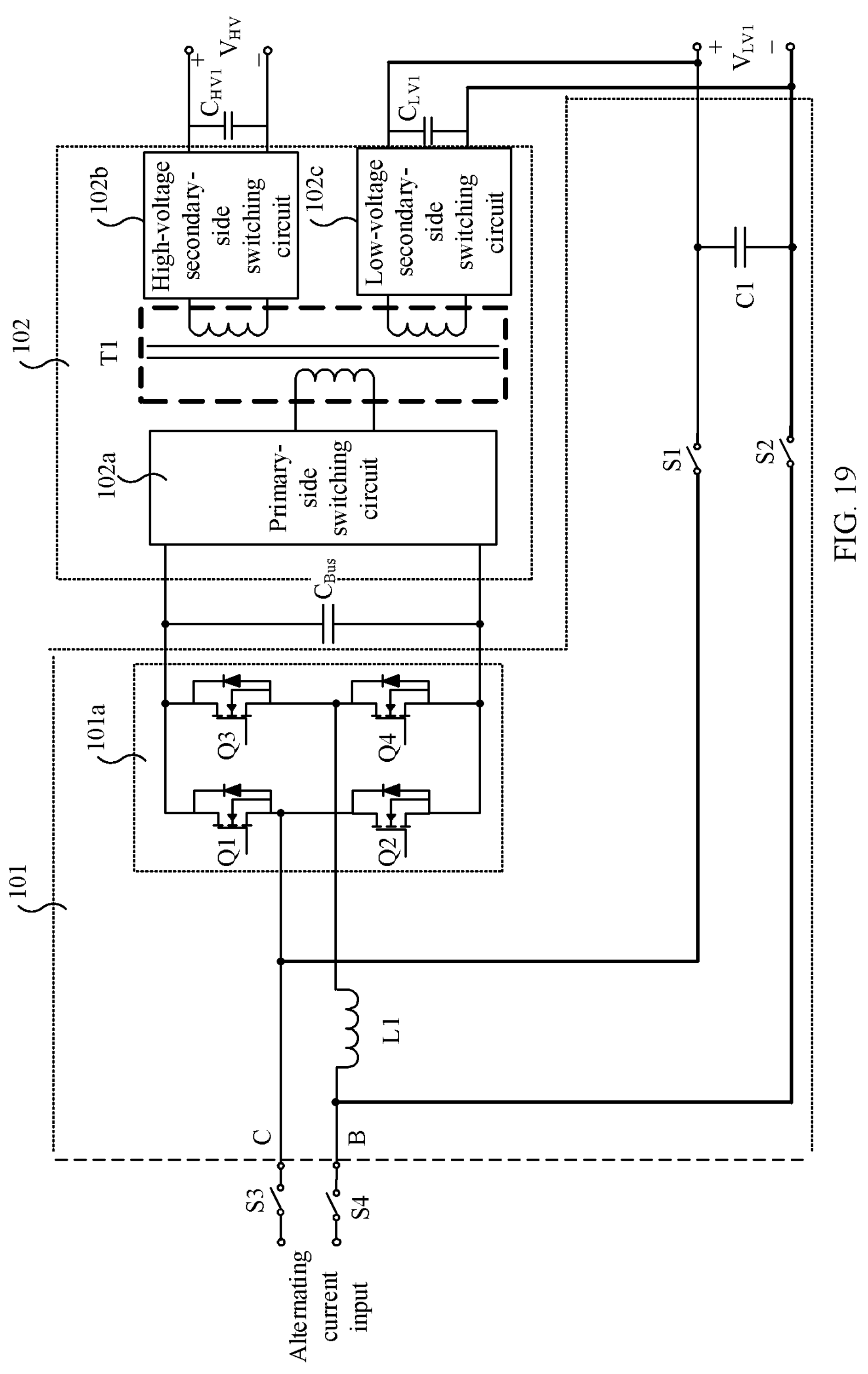
FIG. 19 is a schematic diagram of still another charging circuit of an on-board charger according to an embodiment of this disclosure.

FIG. 19 is a schematic diagram of still another charging circuit of an on-board charger provided in this embodiment of this disclosure.

In this case, the positive output end of the second low-voltage output end is connected to a positive output end of the first low-voltage output end, and a negative output end of the second low-voltage output end is connected to a negative output end of the first low-voltage output end. In this case, the two low-voltage direct current outputs are connected in parallel to jointly supply power to the low-voltage system of the electric vehicle.

Similarly, there may be one or more controllers in this embodiment of this disclosure.

In some embodiments, the switching transistors of the first power conversion circuit are controlled by one controller, and the switching transistors of the second power conversion circuit are controlled by another controller.

In some other embodiments, switching transistors connected to a high voltage are controlled by one controller, that is, the switching transistors in the full-bridge switching circuit 101*a*, the primary-side switching circuit 102*a*, and the high-voltage secondary-side switching circuit 102*b* are controlled by one controller, and switching transistors connected to a low voltage is controlled by another controller, that is, the low-voltage secondary-side switching circuit, the first switching transistor S1, and the second switching transistor S2 are controlled by another controller.

In conclusion, the first power conversion circuit of the charging circuit provided in this embodiment of this disclosure functions as a power factor correction circuit when the electric vehicle is in the charging mode, and functions as a DC-DC conversion circuit when the electric vehicle is in the driving mode. Therefore, the first power conversion circuit has different functions when the electric vehicle is in different modes. An output when the first power conversion circuit is used as a DC-DC conversion circuit is used as the second low-voltage direct current output, so that an additional DC-DC circuit is not needed. Therefore, the charging circuit provided in this embodiment of this disclosure provides dual redundant low-voltage direct current outputs, and costs are reduced.

On-Board Charger Embodiment

Based on the charging circuit of an on-board charger provided in the foregoing embodiments, this embodiment of this disclosure further provides an on-board charger. The following describes the on-board charger in detail with reference to an accompanying drawing.

Figure 20:
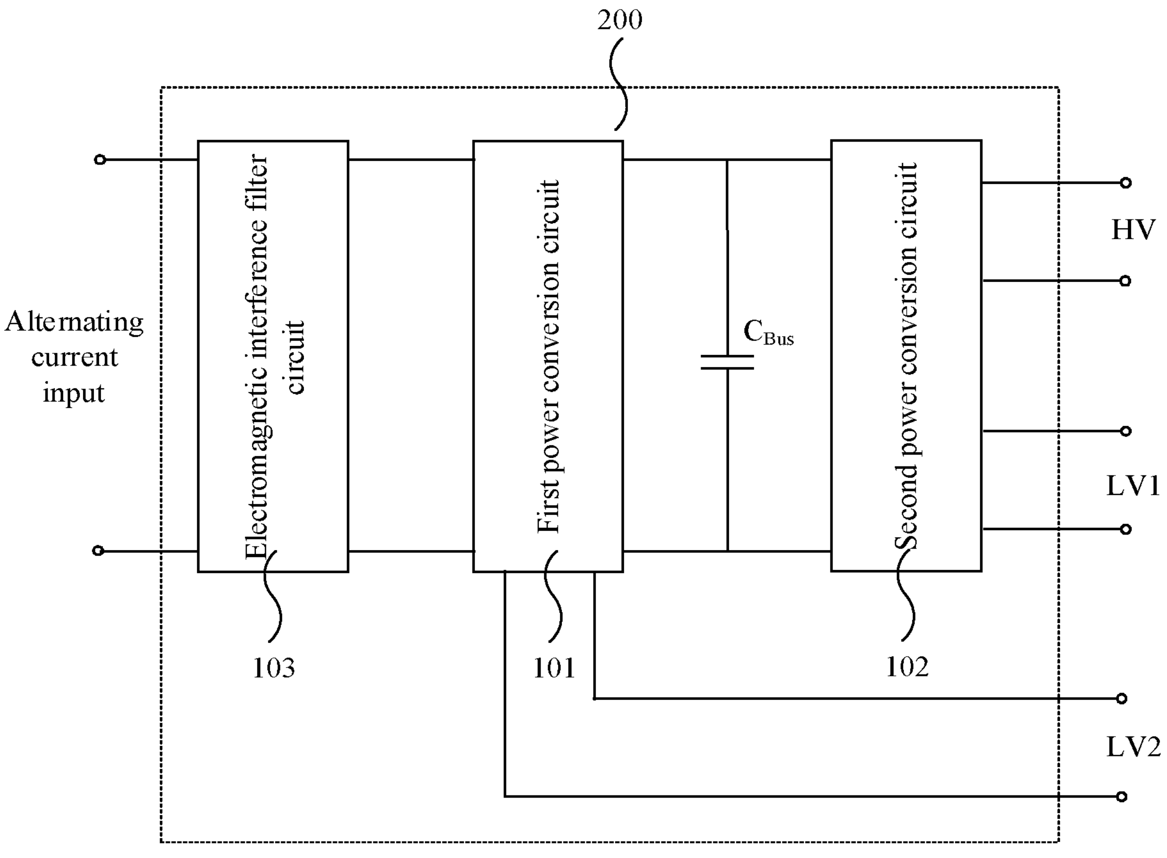
FIG. 20 is a schematic diagram of an on-board charger according to an embodiment of this disclosure.

FIG. 20 is a schematic diagram of the on-board charger provided in this embodiment of this disclosure.

The on-board charger 200 includes the charging circuit of an on-board charger provided in the foregoing embodiments, and an EMI filter circuit 103.

The charging circuit of the on-board charger further includes a first power conversion circuit 101 and a second power conversion circuit 102.

An input end of the electromagnetic interference filter circuit 103 is connected to an alternating current input of the on-board charger, and an output end is connected to a first end of the first power conversion circuit 101. The electromagnetic interference filter circuit is configured to filter out electromagnetic interference when an electric vehicle is in a charging mode.

The following describes an operating principle of the on-board charger.

When the electric vehicle is in the charging mode, an alternating current input is transmitted to the first end of the first power conversion circuit 101 after passing through the electromagnetic interference filter circuit 103. In this case, the first power conversion circuit 101 converts the alternating current input from the first end into a direct current and supplies the direct current to the second power conversion circuit. That is, the first power conversion circuit has a function of a power factor correction circuit and implements alternating current-direct current conversion. The second power conversion circuit 102 converts the direct current transmitted by the first power conversion circuit 101 into a high-voltage direct current to charge a power battery pack of the electric vehicle through a high-voltage output end, and converts the direct current transmitted by the first power conversion circuit 101 into a low-voltage direct current to supply power to a low-voltage system of the electric vehicle.

When the electric vehicle is in a driving mode, the low-voltage system of the electric vehicle is powered by the power battery pack. In this case, the high-voltage direct current provided by the power battery pack can be converted into a low-voltage direct current by the second power conversion circuit 102, and then the low-voltage direct current is supplied to the low-voltage system through a first low-voltage output end LV1, to form a first low-voltage direct current output. The second power conversion circuit 102 can also convert a high voltage obtained from the power battery pack into a direct current through current conversion and transmit the direct current to the first power conversion circuit 101, and the first power conversion circuit 101 performs direct current conversion on the obtained direct current and then supplies the direct current to a second low-voltage output end LV2, to form a second low-voltage direct current output. In this case, the first power conversion circuit 101 functions as a DC-DC conversion circuit.

For a specific implementation and an operating principle of each of the first power conversion circuit 101 and the second power conversion circuit 102, refer to related descriptions in the foregoing embodiments. Details are not described herein again in this embodiment of this disclosure.

In the foregoing descriptions, the on-board charger includes the following two low-voltage output ends: the first low-voltage output end LV1 and the second low-voltage output end LV2. In some other embodiments, the first low-voltage output end LV1 and the second low-voltage output end LV2 can also be connected in parallel. In this case, the charging circuit presents a low-voltage output end for an externally connected low-voltage system of the electric vehicle. This is described in detail below with reference to an accompanying drawing.

Figures 21, 22:
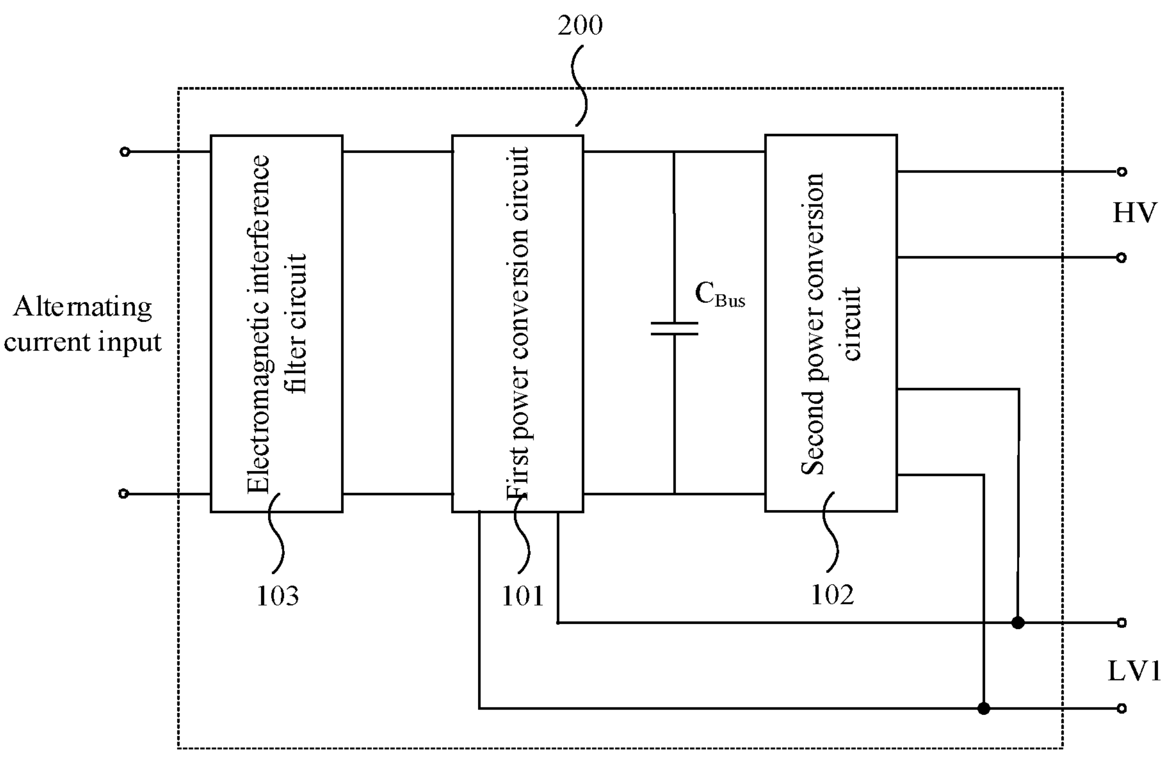
FIG. 21 is a schematic diagram of another on-board charger according to an embodiment of this disclosure.
FIG. 22 is a schematic diagram of a charging control method according to an embodiment of this disclosure.

FIG. 21 is a schematic diagram of another on-board charger provided in this embodiment of this disclosure.

In this case, a positive output end of the second low-voltage output end is connected to a positive output end of the first low-voltage output end, and a negative output end of the second low-voltage output end is connected to a negative output end of the first low-voltage output end. The two low-voltage direct current outputs are connected in parallel and jointly supply power to the low-voltage system of the electric vehicle. The on-board charger has a low-voltage output end represented by LV1.

In conclusion, the first power conversion circuit of the on-board charger functions as a power factor correction circuit when the electric vehicle is in the charging mode, and functions as a DC-DC conversion circuit when the electric vehicle is in the driving mode. The electromagnetic interference filter circuit is configured to filter out electromagnetic interference when the electric vehicle is in the charging mode. The first power conversion circuit has different functions when the electric vehicle is in different modes. An output when the first power conversion circuit is used as a DC-DC conversion circuit is used as the second low-voltage direct current output, so that an additional DC-DC circuit is not needed. Therefore, the on-board charger provided in this embodiment of this disclosure can provide dual redundant low-voltage direct current outputs, and costs are reduced.

Method Embodiment

Based on the charging circuit of an on-board charger provided in the foregoing embodiments, this embodiment of this disclosure further provides a charging control method that can be applied to the charging circuit. The following describes the charging control method in detail with reference to accompanying drawings.

FIG. 22 is a schematic diagram of a charging control method provided in this embodiment of this disclosure.

The charging control method may be applied to controlling the charging circuit when the electric vehicle is in the charging mode, and further includes the following steps.

S2201: Control a first power conversion circuit to convert an alternating current input from a first end into a direct current, and transmit the direct current to a first end of a second power conversion circuit.

S2202: Control the second power conversion circuit to convert the direct current transmitted by the first power conversion circuit into a high-voltage direct current to charge a power battery pack of the electric vehicle through a high-voltage output end, and convert the direct current transmitted by the first power conversion circuit into a low-voltage direct current to supply power to a low-voltage system.

FIG. 23 is a schematic diagram of another charging control method provided in this embodiment of this disclosure.

The charging control method may be applied to controlling the charging circuit when the electric vehicle is in a driving mode, and further includes the following steps:

S2301: Control the second power conversion circuit to convert a high voltage of a power battery pack into a low voltage and transmit the low voltage to a first low-voltage output end, and output a direct current to the first power conversion circuit.

S2302: Control the first power conversion circuit to perform direct current conversion on the direct current obtained from the second power conversion circuit, and then supply the direct current to the low-voltage system.

S2303: Adjust a control signal of a switching transistor in the first power conversion circuit based on an output voltage of the first power conversion circuit and a preset voltage.

The following describes the charging control method in detail with reference to implementations of the first power conversion circuit and the second power conversion circuit.

The second power conversion circuit further includes a primary-side switching circuit, a first transformer, a high-voltage secondary-side switching circuit, and a low-voltage secondary-side switching circuit.

In some embodiments, the first power conversion circuit further includes a full-bridge switching circuit, a second transformer, a first switching transistor, a second switching transistor, a first capacitor, and a first inductor.

For specific descriptions of the first power conversion circuit and the second power conversion circuit, refer to the foregoing charging circuit embodiments. Details are not described herein again in this embodiment of this disclosure.

When the electric vehicle is in the charging mode, S2201 further includes controlling a switching transistor in the full-bridge switching circuit to convert an alternating current input from an input end of the full-bridge switching circuit into a direct current and then supply the direct current to the primary-side switching circuit of the second power conversion circuit.

S2202 further includes controlling a switching transistor in the primary-side switching circuit, so that the primary-side switching circuit converts the direct current into an alternating current, transmits the alternating current to the high-voltage output end through the first transformer to charge the power battery pack, and transmits the alternating current into the first low-voltage output end to supply power to the low-voltage system.

When the electric vehicle is in the driving mode, S2301 further includes controlling a switching transistor in the high-voltage secondary-side switching circuit to convert a direct current input by the power battery pack into an alternating current and then transmit the alternating current to a high-voltage secondary-side winding, controlling a switching transistor in the primary-side switching circuit to convert an alternating current input by a primary-side winding into a direct current and transmit the direct current to the first power conversion circuit, and controlling a switching transistor in the low-voltage secondary-side switching circuit to convert an alternating current transmitted by the low-voltage secondary-side winding into a direct current and transmit the direct current to the first low-voltage output end.

S2301 further includes adjusting a duty cycle of a control signal of a controllable switching transistor in the primary-side switching circuit and/or the high-voltage secondary-side switching circuit, so that a direct current voltage output by the primary-side switching circuit to the first power conversion circuit remains stable.

S2302 further includes controlling a switching transistor in the full-bridge switching circuit, the first switching transistor, and the second switching transistor, so that the first power conversion circuit performs direct current conversion on a direct current obtained from the primary-side switching circuit and then transmits a converted current to the second low-voltage output end.

Controlling an operating state of a switching transistor in the full-bridge switching circuit further includes controlling a switching transistor of an upper half bridge arm of a first bridge arm and a switching transistor of a lower half bridge arm of a second bridge arm to be simultaneously turned on or turned off, controlling a switching transistor of a lower half bridge arm of the first bridge arm and a switching transistor of an upper half bridge arm of the second bridge arm to be simultaneously turned on or turned off, and controlling the switching transistor of the upper half bridge arm of the first bridge arm and the switching transistor of the lower half bridge arm of the first bridge arm not to be simultaneously turned on.

S2303 further includes adjusting a control signal of a switching transistor in the full-bridge switching circuit based on an output voltage of the second low-voltage output end and a preset voltage. To be specific, when the output voltage of the second low-voltage output end is less than the preset voltage, a duty cycle of the control signal of the switching transistor in the full-bridge switching circuit is increased, so that the output voltage of the second low-voltage output end is increased to the preset voltage, and when the output voltage of the second low-voltage output end is greater than the preset voltage, the duty cycle of the control signal of the switching transistor in the full-bridge switching circuit is reduced, so that the output voltage of the second low-voltage output end is reduced to the preset voltage.

In some embodiments, the first power conversion circuit further includes a third switching transistor (namely, Q7 in FIG. 13), and the charging circuit further includes a first switch (S1 in FIG. 13) and a second switch (S2 in FIG. 13). For specific descriptions, refer to the foregoing embodiments. Details are not described herein again in this embodiment of this disclosure.

In this case, S2201 further includes controlling the third switching transistor to be turned off, controlling the first switch to be turned on, and controlling the second switch to be turned off.

S2302 further includes controlling the third switching transistor to be turned on, controlling the first switch to be turned off, and controlling the second switch to be turned on.

In some other embodiments, the first power conversion circuit further includes the full-bridge switching circuit, the first inductor, the first switch, the second switch, and the first capacitor.

When the electric vehicle is in the charging mode, S2201 further includes controlling a switching transistor in the full-bridge switching circuit to convert an alternating current input from the input end of the full-bridge switching circuit into a direct current and then supply the direct current to the primary-side switching circuit of the second power conversion circuit.

S2202 further includes controlling the switching transistor in the primary-side switching circuit, so that the primary-side switching circuit converts the direct current into an alternating current, transmits the alternating current to the high-voltage output end through the first transformer to charge the power battery pack, and transmits the alternating current into the first low-voltage output end to supply power to the low-voltage system.

When the electric vehicle is in the driving mode, S2302 further includes controlling the first switch and the second switch to be turned on, and controlling an operating state of a switching transistor in the full-bridge switching circuit, so that the first power conversion circuit performs direct current conversion on a direct current obtained from the primary-side switching circuit and then transmits a converted current to the second low-voltage output end.

Further, controlling an operating state of a switching transistor in the full-bridge switching circuit includes controlling the switching transistor of the upper half bridge arm of the first bridge arm to maintain a turn-on state, controlling the switching transistor of the lower half bridge arm of the first bridge arm to maintain a turn-off state, and controlling the switching transistor of the upper half bridge arm of the second bridge arm and the switching transistor of the lower half bridge arm of the second bridge arm to be alternately turned on.

S2303 further includes adjusting a control signal of a switching transistor in the full-bridge switching circuit based on the output voltage of the second low-voltage output end and the preset voltage. To be specific, when the output voltage of the second low-voltage output end is less than the preset voltage, a duty cycle of a control signal of the switching transistor in the full-bridge switching circuit is increased, so that the output voltage of the second low-voltage output end is increased to the preset voltage, and when the output voltage of the second low-voltage output end is greater than the preset voltage, the duty cycle of the control signal of the switching transistor in the full-bridge switching circuit is reduced, so that the output voltage of the second low-voltage output end is reduced to the preset voltage. Further, this can be implemented by adjusting a duty cycle of a control signal of the switching transistor of the upper half bridge arm of the second bridge arm and a duty cycle of a control signal of the switching transistor of the lower half bridge arm of the second bridge arm.

In some embodiments, the charging circuit further includes a third switch (S3 in FIG. 15) and a fourth switch (S4 in FIG. 15). For specific descriptions, refer to the foregoing embodiments. Details are not described herein again in this embodiment of this disclosure.

In this case, S2201 further includes controlling the third switch and the fourth switch to be turned on.

S2302 further includes controlling the third switch and the fourth switch to be turned off.

For the two implementations of the first power conversion circuit, when a positive output end of the second low-voltage output end is connected to a positive output end of the first low-voltage output end, and a negative output end of the second low-voltage output end is connected to a negative output end of the first low-voltage output end, two low-voltage direct current outputs are connected in parallel and jointly supply power to the low-voltage system of the electric vehicle. In this case, the charging circuit has one low-voltage output end.

It may be understood that the foregoing steps and a sequence of the steps are merely for ease of description of a principle of the method provided in this disclosure, but are not intended to limit an execution sequence of a specific implementation of the method.

In some embodiments, a memory of the on-board charger stores one or more computer programs. The one or more computer programs include instructions, and when the instructions are executed by the controller, the steps in the foregoing method are implemented. There may be one or more controllers. This is not limited in this embodiment of this disclosure.

In conclusion, in the method provided in this embodiment of this disclosure, when the electric vehicle is in the charging mode, the first power conversion circuit is controlled to function as a power factor correction circuit, and when the electric vehicle is in the driving mode, the first power conversion circuit is controlled to function as a DC-DC conversion circuit. Therefore, the first power conversion circuit has different functions when the electric vehicle is in different modes. In the method, the output when the first power conversion circuit is used as a DC-DC conversion circuit is used as a second low-voltage direct current output, so that an additional DC-DC circuit is not needed. Therefore, dual redundant low-voltage direct current outputs can be provided, and costs can be reduced.

It should be understood that, in this disclosure, "at least one" means one or more, and "a plurality of" means two or more. The term "and/or" is used to describe an association relationship between associated objects, and indicates that three relationships may exist. For example, "A and/or B" may indicate the following three cases: only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The embodiments in this specification are all described in a progressive manner, for same or similar parts in the embodiments, refer to these embodiments, and each embodiment focuses on a difference from other embodiments. Especially, an apparatus embodiment is basically similar to a method embodiment, and therefore is described briefly, for related parts, reference may be made to partial descriptions in the method embodiment. The device embodiments described above are only examples. The units and modules described as separate components may or may not be physically separated. In addition, some or all units and modules may be selected according to actual needs, to achieve objectives in this embodiment. A person of ordinary skill in the art may understand and implement the embodiments of the present disclosure without creative efforts.

The foregoing descriptions are merely specific implementations of this disclosure. It should be noted that a person of ordinary skill in the art may make some improvements and modifications without departing from a principle of this disclosure, and these improvements and modifications shall also be considered as within the protection scope of this disclosure.

What is claimed is:

1. A charging circuit of an on-board charger and comprising:
- a second power conversion circuit comprising:
  - a second controllable switching transistor;
  - a first end;
  - a high-voltage output end configured to charge a power battery pack of an electric vehicle;
  - a first low-voltage output end configured to supply power to a low-voltage system of the electric vehicle;
  - a primary-side switching circuit comprising:
    - a second switching transistor;
    - a fourth end, wherein the fourth end is the first end; and
    - a fifth end;
  - a first transformer comprising:
    - a first primary-side winding coupled to the fifth end;
    - a high-voltage secondary-side winding; and
    - a low-voltage secondary-side winding;
  - a high-voltage secondary-side switching circuit comprising:
    - a first switching transistor;
    - a sixth end coupled to the high-voltage secondary-side winding; and
    - a seventh end that is the high-voltage output end; and
  - a low-voltage secondary-side switching circuit comprising:
    - a third switching transistor;
    - an eighth end coupled to the low-voltage secondary-side winding; and
    - a ninth end that is the first low-voltage output end;
- a first power conversion circuit comprising:
  - a first controllable switching transistor;
  - a second end coupled to the first end; and
  - a third end,
  - wherein the first power conversion circuit is configured to:
    - when the electric vehicle is in a charging mode:
      - convert an alternating current input from the third end into a direct current; and
      - transmit the direct current to the first end; and
    - when the electric vehicle is in a driving mode:
      - perform direct current conversion on the direct current to obtain a converted current; and
      - supply the converted current to the low-voltage system, and
  - wherein when the electric vehicle is in the driving mode, the second power conversion circuit is configured to:
    - convert a high voltage of the power battery pack into a low voltage;
    - transmit the low voltage to the first low-voltage output end; and
    - output the direct current to the first power conversion circuit; and
- a controller coupled to the first power conversion circuit and the second power conversion circuit and configured to:
  - control operating states of each of the first controllable switching transistor and the second controllable switching transistor; and
  - when the electric vehicle is in the driving mode:
    - control the first switching transistor to convert a first direct current from the power battery pack into a first alternating current;
    - transmit the first alternating current to the high-voltage secondary-side winding;
    - control the second switching transistor to convert a second alternating current from the first primary-side winding into a second direct current;
    - transmit the second direct current to the first power conversion circuit;
    - control the third switching transistor to convert a third alternating current from the low-voltage secondary-side winding into a third direct current; and
    - transmit the third direct current to the first low-voltage output end.

2. The charging circuit of claim 1, wherein the third end comprises a first port and a second port, and wherein the first power conversion circuit further comprises:
- a first capacitor;
- a first inductor;
- a fourth switching transistor;
- a fifth switching transistor;
- a second transformer comprising:
  - a second primary-side winding; and
  - a secondary-side winding; and
- a full-bridge switching circuit comprising:
  - two bridge arms, wherein an upper half bridge arm and a lower half bridge arm of each of the two bridge arms each comprise a sixth switching transistor, wherein a first middle point of a first bridge arm of the two bridge arms is coupled in series to the second primary-side winding and the first port of the third end, and wherein a second middle point of a second bridge arm of the two bridge arms is coupled to the second port of the third end; and an output end that is the second end, wherein a tenth end of the secondary-side winding is coupled in series to the fourth switching transistor and a first end point, wherein an eleventh end of the secondary-side winding is coupled in series to the fifth switching transistor and the first end point, wherein a central tap of the secondary-side winding is sequentially coupled in series to the first capacitor, the first inductor, and the first end point, wherein the first end point is coupled to a third port of a second low-voltage output end, wherein a fourth port of the second low-voltage output end is coupled between the first inductor and the first capacitor, and wherein when the electric vehicle is in the driving mode, the controller is further configured to control the sixth switching transistor, the fourth switching transistor, and the fifth switching transistor to enable the first power conversion circuit to perform direct current conversion on a fourth direct current obtained from the primary-side switching circuit to obtain a second converted current and transmit the second converted current to the second low-voltage output end.

3. The charging circuit of claim 2, wherein the first power conversion circuit further comprises a seventh switching transistor comprising:

a twelfth end coupled between the first inductor and the first capacitor; and a thirteenth end coupled to the fourth port, and wherein the controller is further configured to:

control the seventh switching transistor to be turned off when the electric vehicle is in the charging mode; and control the seventh switching transistor to be turned on when the electric vehicle is in the driving mode.

4. The charging circuit of claim 2, further comprising:

a first switch comprising:

a twelfth end coupled to a first alternating current port; and a thirteenth end; and a second switch comprising:

a fourteenth end coupled to the thirteenth end and the second middle point; and a fifteenth end coupled to a second alternating current port, wherein the first middle point is coupled in series to the second primary-side winding and the fifteenth end, and wherein the controller is further configured to:

control the first switch to be turned on and the second switch to be turned off when the electric vehicle is in the charging mode; and control the first switch to be turned off and the second switch to be turned on when the electric vehicle is in the driving mode.

5. The charging circuit of claim 2, wherein the first low-voltage output end comprises a first positive output end and a first negative output end, and wherein the second low-voltage output end comprises:

a second positive output end coupled to the first positive output end; and a second negative output end coupled to the first negative output end.

6. The charging circuit of claim 2, wherein the controller is further configured to:

when the electric vehicle is in the charging mode:

control the sixth switching transistor to convert a fourth alternating current input from an input end of the full-bridge switching circuit into a fifth direct current; and supply the fifth direct current to the primary-side switching circuit, and when the electric vehicle is in the driving mode:

control the second switching transistor to enable the primary-side switching circuit to convert the fifth direct current into a fifth alternating current, transmit the fifth alternating current to the high-voltage output end through the first transformer to charge the power battery pack, and transmit the fifth alternating current to the first low-voltage output end to supply power to the low-voltage system.

7. The charging circuit of claim 1, wherein the third end comprises a first port and a second port, and wherein the first power conversion circuit further comprises:

a first switch comprising:

a tenth end; and an eleventh end coupled to a third port of a second low-voltage output end;

a first inductor;

a second switch comprising:

a twelfth end; and a thirteenth end coupled to a fourth port of the second low-voltage output end;

a first capacitor coupled in parallel between the eleventh end and the thirteenth end; and a full-bridge switching circuit comprising:

two bridge arms, wherein an upper half bridge arm and a lower half bridge arm of each of the two bridge arms each comprise a fourth switching transistor, wherein a first middle point of a first bridge arm is coupled to the tenth end and the first port, wherein a second middle point of a second bridge arm is coupled in series to the first inductor, the twelfth end, and the second port; and an output end that is the second end, wherein when the electric vehicle is in the driving mode, the controller is further configured to:

control the first switch and the second switch to be turned on; and control an operating state of the fourth switching transistor to enable the first power conversion circuit to perform direct current conversion on a fourth direct current obtained from the primary-side switching circuit to obtain a second converted current and to transmit the second converted current to the second low-voltage output end.

8. The charging circuit of claim 7, further comprising:

a third switch comprising:

a fourteenth end coupled to a first alternating current port; and a fifteenth end coupled to the first port; and a fourth switch comprising:

a sixteenth end coupled to a second alternating current port; and a seventeenth end coupled to the second port, wherein the controller is further configured to:

control the third switch and the fourth switch to be turned on when the electric vehicle is in the charging mode; and control the third switch and the fourth switch to be turned off when the electric vehicle is in the driving mode.

9. The charging circuit of claim 7, wherein the controller is further configured to:

control a seventh switching transistor of the upper half bridge arm of the first bridge arm to maintain a turn-on state;

control an eighth switching transistor of the lower half bridge arm of the first bridge arm to maintain a turn-off state; and control a ninth switching transistor of the upper half bridge arm of the second bridge arm and a tenth switching transistor of the lower half bridge arm of the second bridge arm to be alternately turned on.

10. The charging circuit of claim 2, wherein the controller is further configured to:

control a seventh switching transistor of the upper half bridge arm of the first bridge arm and an eighth switching transistor of the lower half bridge arm of the second bridge arm to be simultaneously turned on or turned off;

control a ninth switching transistor of the lower half bridge arm of the first bridge arm and a tenth switching transistor of the upper half bridge arm of the second bridge arm to be simultaneously turned on or turned off; and control the seventh switching transistor and the ninth switching transistor not to be simultaneously turned on.

11. The charging circuit of claim 10, wherein the controller is further configured to adjust a control signal of the sixth switching transistor based on an output voltage of the second low-voltage output end and a preset voltage.

12. The charging circuit of claim 11, wherein the controller is further configured to:

increase a duty cycle of the control signal when the output voltage is less than the preset voltage to enable the output voltage to increase to the preset voltage; and reduce the duty cycle when the output voltage is greater than the preset voltage to enable the output voltage to reduce to the preset voltage.

13. The charging circuit of claim 1, wherein the controller is further configured to adjust a duty cycle of a control signal of a third controllable switching transistor in the primary-side switching circuit or the high-voltage secondary-side switching circuit to make a direct current voltage output by the primary-side switching circuit to the first power conversion circuit remain stable.

14. The charging circuit of claim 1, further comprising:

a secondary-side high-voltage capacitor coupled in parallel to a positive output end of the high-voltage output end and a negative output end of the high-voltage output end; and a secondary-side low-voltage capacitor coupled in parallel to a positive output end of the first low-voltage output end and a negative output end of the first low-voltage output end.

15. The charging circuit of claim 1, wherein the first power conversion circuit further comprises two ports located at the second end, and wherein the charging circuit further comprises a bus capacitor coupled in parallel between the two ports and configured to reduce fluctuation of a direct current voltage.

16. The charging circuit of claim 1, wherein the first controllable switching transistor and the second controllable switching transistor are controlled by a same controller or a plurality of controllers.

17. An on-board charger comprising:

a first alternating current input;

a charging circuit comprising:

a second power conversion circuit comprising:

a second controllable switching transistor;

a first end;

a high-voltage output end configured to charge a power battery pack of an electric vehicle;

a first low-voltage output end configured to supply power to a low-voltage system of the electric vehicle;

a primary-side switching circuit comprising:

a second switching transistor;

a fourth end, wherein the fourth end is the first end; and a fifth end;

a first transformer comprising:

a first primary-side winding coupled to the fifth end;

a high-voltage secondary-side winding; and a low-voltage secondary-side winding;

a high-voltage secondary-side switching circuit comprising:

a first switching transistor;

a sixth end coupled to the high-voltage secondary-side winding; and a seventh end that is the high-voltage output end; and a low-voltage secondary-side switching circuit comprising:

a third switching transistor;

an eighth end coupled to the low-voltage secondary-side winding; and a ninth end that is the first low-voltage output end;

a first power conversion circuit comprising:

a first controllable switching transistor;

a second end coupled to the first end; and a third end, wherein the first power conversion circuit is configured to:

when the electric vehicle is in a charging mode:

convert a second alternating current input from the third end into a direct current; and transmit the direct current to the first end; and when the electric vehicle is in a driving mode:

perform direct current conversion on the direct current to obtain a converted current; and supply the converted current to the low-voltage system, wherein when the electric vehicle is in the driving mode, the second power conversion circuit is configured to:

convert a high voltage of the power battery pack into a low voltage;

transmit the low voltage to the first low-voltage output end; and output the direct current to the first power conversion circuit; and a controller coupled to the first power conversion circuit and the second power conversion circuit and configured to:

control operating states of each of the first controllable switching transistor and the second controllable switching transistor; and when the electric vehicle is in the driving mode:

control the first switching transistor to convert a first direct current from the power battery pack into a first alternating current;

transmit the first alternating current to the high-voltage secondary-side winding;

control the second switching transistor to convert a second alternating current from the first primary-side winding into a second direct current;

transmit the second direct current to the first power conversion circuit;

control the third switching transistor to convert a third alternating current from the low-voltage secondary-side winding into a third direct current; and transmit the third direct current to the first low-voltage output end; and an electromagnetic interference (EMI) filter circuit comprising:

an input end coupled to the first alternating current input; and an output end coupled to the third end, wherein the EMI filter circuit is configured to filter out electromagnetic interference.

18. The on-board charger claim 17, wherein the controller is further configured to adjust a duty cycle of a control signal of a third controllable switching transistor in the primary-side switching circuit or the high-voltage secondary-side switching circuit to make a direct current voltage output by the primary-side switching circuit to the first power conversion circuit remain stable.

19. The on-board charger of claim 17, wherein the charging circuit further comprises:

a secondary-side high-voltage capacitor coupled in parallel to a positive output end of the high-voltage output end and a negative output end of the high-voltage output end; and a secondary-side low-voltage capacitor coupled in parallel to a positive output end of the first low-voltage output end and a negative output end of the first low-voltage output end.

20. A control method for an on-board charger, wherein the control method is applied to a charging circuit of the on-board charger, and wherein the control method comprises:

when an electric vehicle is in a charging mode:

controlling a first power conversion circuit of the charging circuit to convert an alternating current input from a third end of the first power conversion circuit into a direct current and transmit the direct current to a first end of a second power conversion circuit of the charging circuit; and when the electric vehicle is in a driving mode:

controlling the second power conversion circuit to convert a high voltage of a power battery pack into a low voltage, transmit the low voltage to a first low-voltage output end of the second power conversion circuit, and output the direct current to the first power conversion circuit;

controlling the first power conversion circuit to perform direct current conversion on the direct current to obtain a converted current and supply the converted current to a low-voltage system of the electric vehicle;

controlling a first switching transistor of a high-voltage secondary-side winding of the second power conversion circuit to convert a first direct current from the power battery pack into a first alternating current;

transmitting the first alternating current to the high-voltage secondary-side winding;

controlling a second switching transistor of a primary-side switching circuit of the second power conversion circuit to convert a second alternating current from a first primary-side winding of a transformer of the second power conversion circuit into a second direct current;

transmitting the second direct current to the first power conversion circuit;

controlling a third switching transistor of a low-voltage secondary-side winding of the second power conversion circuit to convert a third alternating current from the low-voltage secondary-side winding into a third direct current; and transmitting the third direct current to the first low-voltage output end.

* * * * *